(12) United States Patent
Harrington

(10) Patent No.: US 8,074,381 B2
(45) Date of Patent: *Dec. 13, 2011

(54) BICYCLE SHOE

(76) Inventor: Jeffrey M. Harrington, Vancouver, WA (US)

( * ) Notice: Subject to any disclaimer, the term of this patent is extended or adjusted under 35 U.S.C. 154(b) by 25 days.

This patent is subject to a terminal disclaimer.

(21) Appl. No.: 12/430,272

(22) Filed: Apr. 27, 2009

(65) Prior Publication Data

US 2009/0205462 A1    Aug. 20, 2009

Related U.S. Application Data

(63) Continuation of application No. 11/517,133, filed on Sep. 6, 2006, now Pat. No. 7,540,101, which is a continuation of application No. 10/457,623, filed on Jun. 9, 2003, now Pat. No. 7,104,158, which is a continuation-in-part of application No. 10/038,374, filed on Dec. 31, 2001, now abandoned, which is a continuation of application No. 09/887,754, filed on Jun. 25, 2001, now Pat. No. 6,543,308, which is a continuation-in-part of application No. 09/498,797, filed on Feb. 6, 2000, now Pat. No. 6,276,234, which is a continuation of application No. 09/146,766, filed on Sep. 3, 1998, now Pat. No. 6,199,449.

(51) Int. Cl.
*A43B 5/00*    (2006.01)

(52) U.S. Cl. ............................................. 36/131; 36/135

(58) Field of Classification Search .................... 36/114, 36/115, 103, 131, 25 R
See application file for complete search history.

(56) References Cited

U.S. PATENT DOCUMENTS

| | | | |
|---|---|---|---|
| 589,443 A | 9/1897 | Rathbun | |
| 3,964,343 A | 6/1976 | Lauterbach | |
| 4,083,263 A | 4/1978 | Lundquist | |
| 4,538,480 A | 9/1985 | Trindle | |
| 4,685,351 A | 8/1987 | Pegg | |
| 4,827,633 A | 5/1989 | Feldstein | |
| 4,836,047 A | 6/1989 | Alcamo | |
| 4,892,009 A | 1/1990 | Gibson | |
| 4,898,063 A | 2/1990 | Sampson | |
| 4,907,469 A | 3/1990 | Gobbi | |

(Continued)

FOREIGN PATENT DOCUMENTS

DE    3436996 A1    4/1986

(Continued)

OTHER PUBLICATIONS

Webster's II New Riverside University Dictionary 1994, p. 240.

(Continued)

*Primary Examiner* — Jila Mohandesi
(74) *Attorney, Agent, or Firm* — Pritzkau Patent Group, LLC

(57) ABSTRACT

A pedal connection arrangement includes a pedal having a spherical portion with an outer spherical surface. The pedal connection arrangement also includes a bicycle shoe that has a pedal gripping cavity that directly engages at least portions of the outer spherical surface of the pedal when the shoe is engaged with the pedal. The shoe is configured so that the pedal gripping cavity securely grips outer spherical surface of the pedal, yet remains free to swivel in various directions about the spherical portion of the pedal when the shoe is engaged with the pedal. The various directions include directions other than about the pedal longitudinal axis, thereby giving more flexibility for movement of the rider's foot while maintaining positive contact between the shoe and the pedal.

7 Claims, 24 Drawing Sheets

U.S. PATENT DOCUMENTS

| | | | |
|---|---|---|---|
| 4,942,778 A | | 7/1990 | Bryne |
| 5,377,561 A | | 1/1995 | Danieli et al. |
| 5,546,829 A | | 8/1996 | Bryne |
| 5,687,619 A | | 11/1997 | Bryne |
| 5,704,256 A | * | 1/1998 | De Lattre ............ 74/594.6 |
| 5,878,514 A | * | 3/1999 | Ueda et al. ............ 36/131 |
| 5,924,220 A | * | 7/1999 | Ueda et al. ............ 36/131 |
| 5,943,795 A | * | 8/1999 | Ueda et al. ............ 36/131 |
| 6,009,641 A | * | 1/2000 | Ryan .................... 36/131 |
| 6,089,122 A | * | 7/2000 | Nagano ............... 74/594.6 |
| 6,179,760 B1 | | 1/2001 | Rumbaugh |
| 6,205,885 B1 | | 3/2001 | Hermansen et al. |
| 6,234,046 B1 | | 5/2001 | Coombe |
| 6,368,256 B1 | | 4/2002 | Rumbaugh |
| 2005/0011305 A1 | | 1/2005 | Menayan |

FOREIGN PATENT DOCUMENTS

| | | |
|---|---|---|
| DE | 19904114 A1 | 8/2000 |
| EP | 0218731 | 10/1985 |
| EP | 174259 A1 | 3/1986 |

OTHER PUBLICATIONS

PTO 06-1671, English Translation of DE 3436996 A1, PTO Dec. 2005, Translated vy Schreiber Translations, Inc.

* cited by examiner

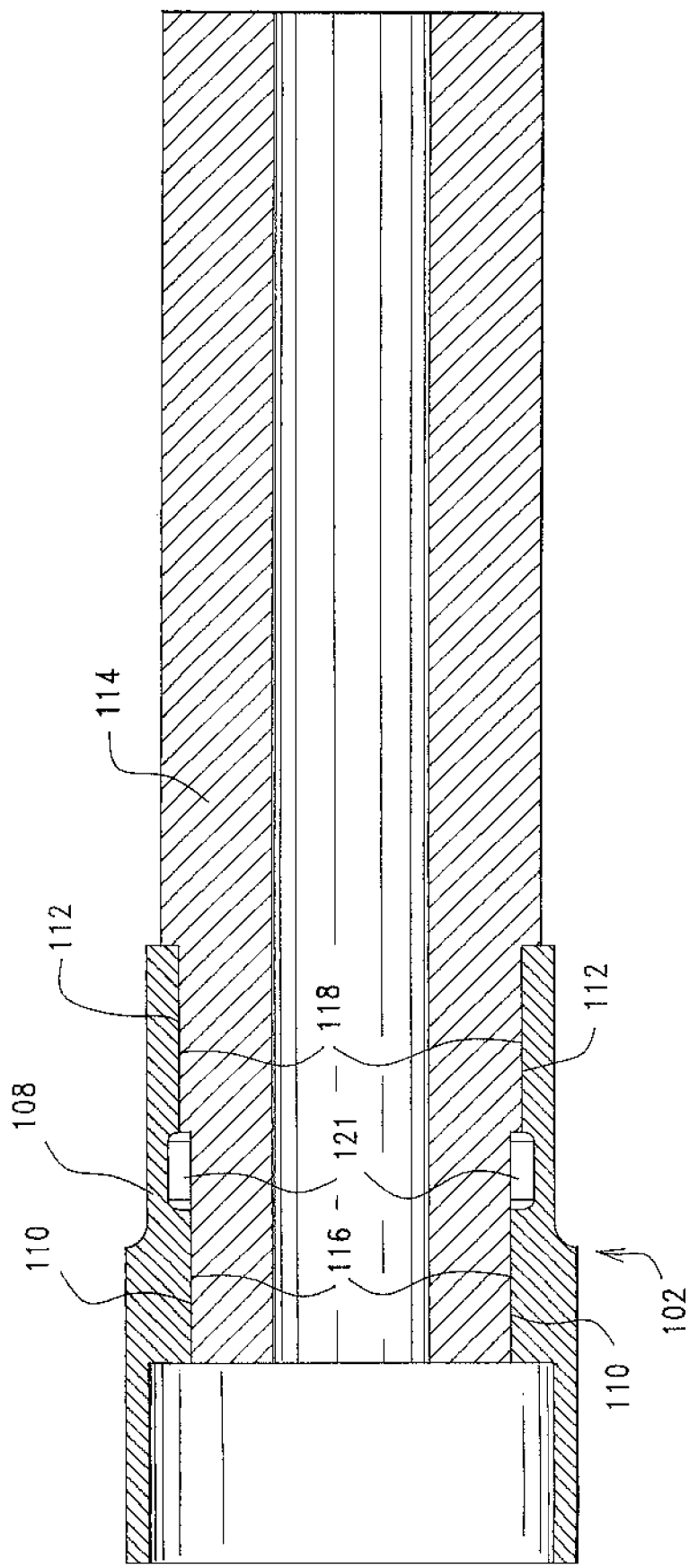

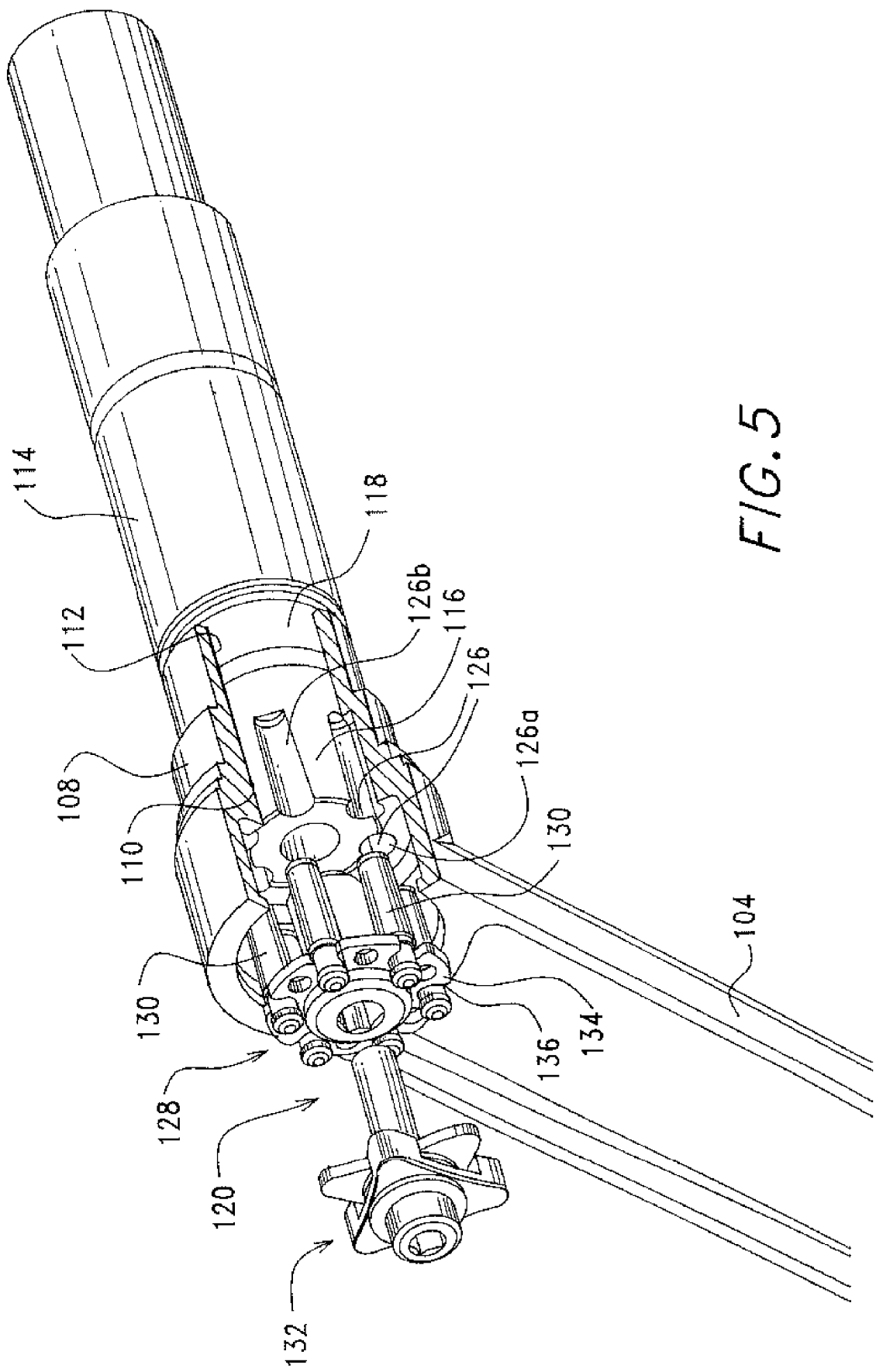

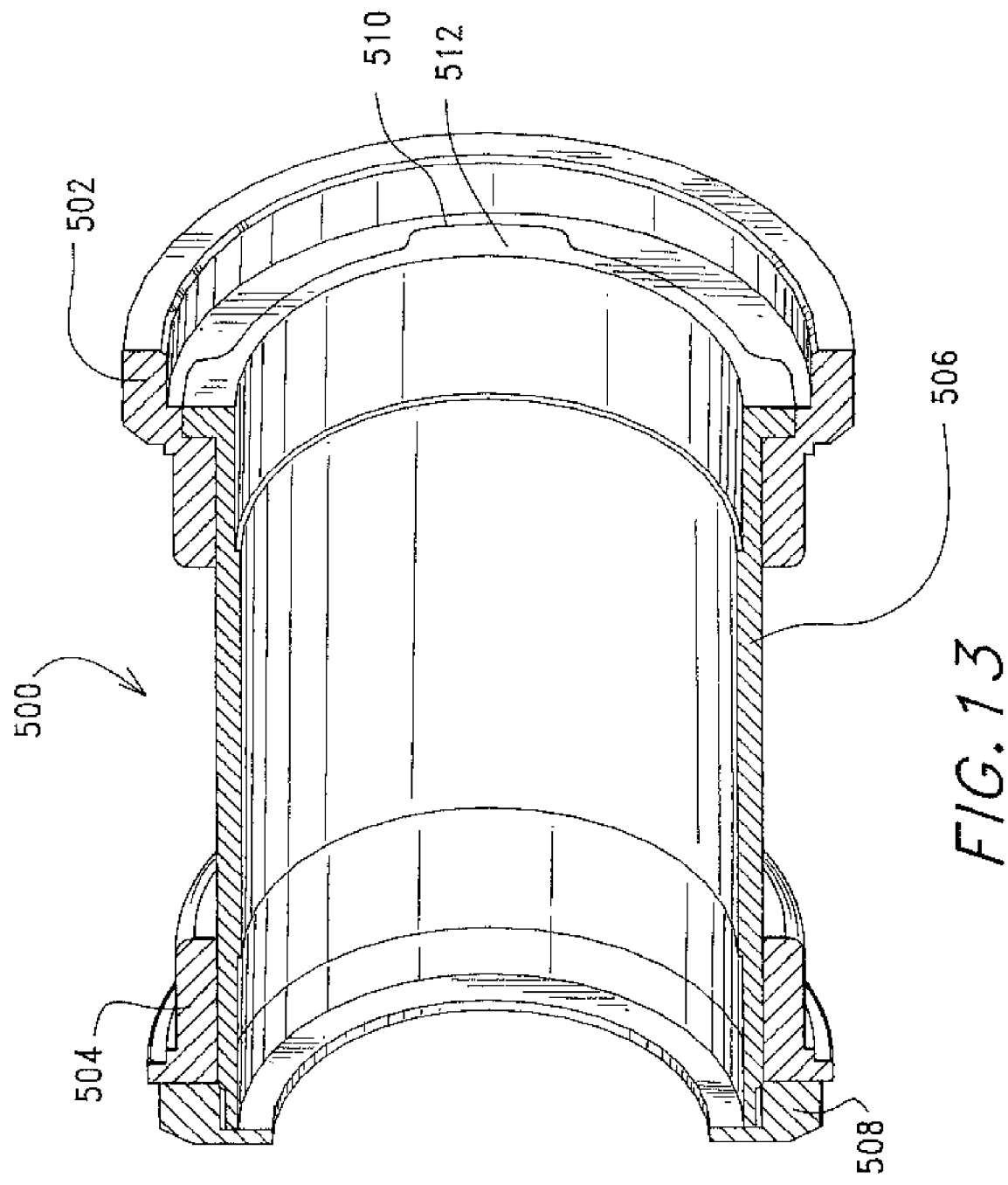

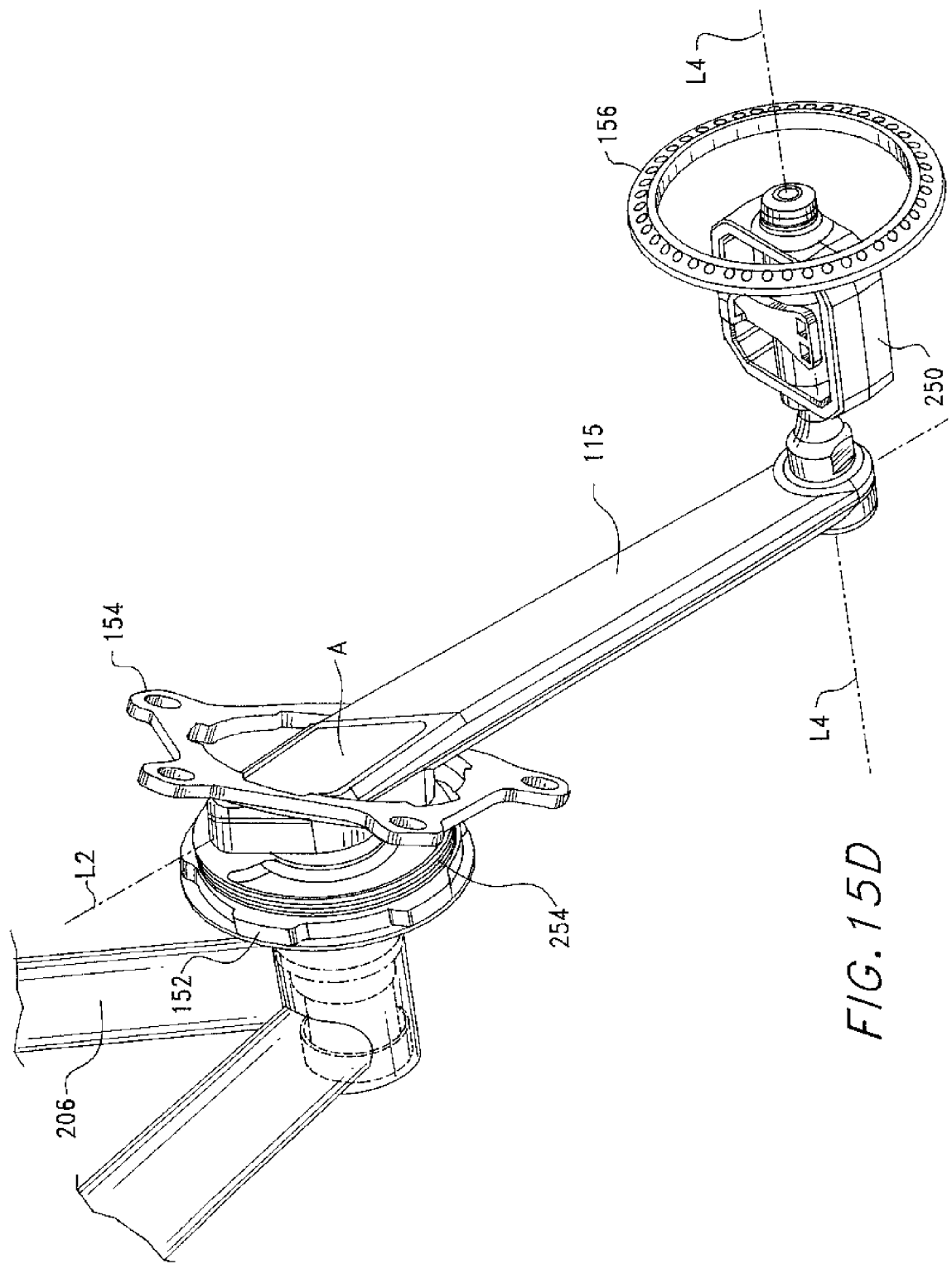

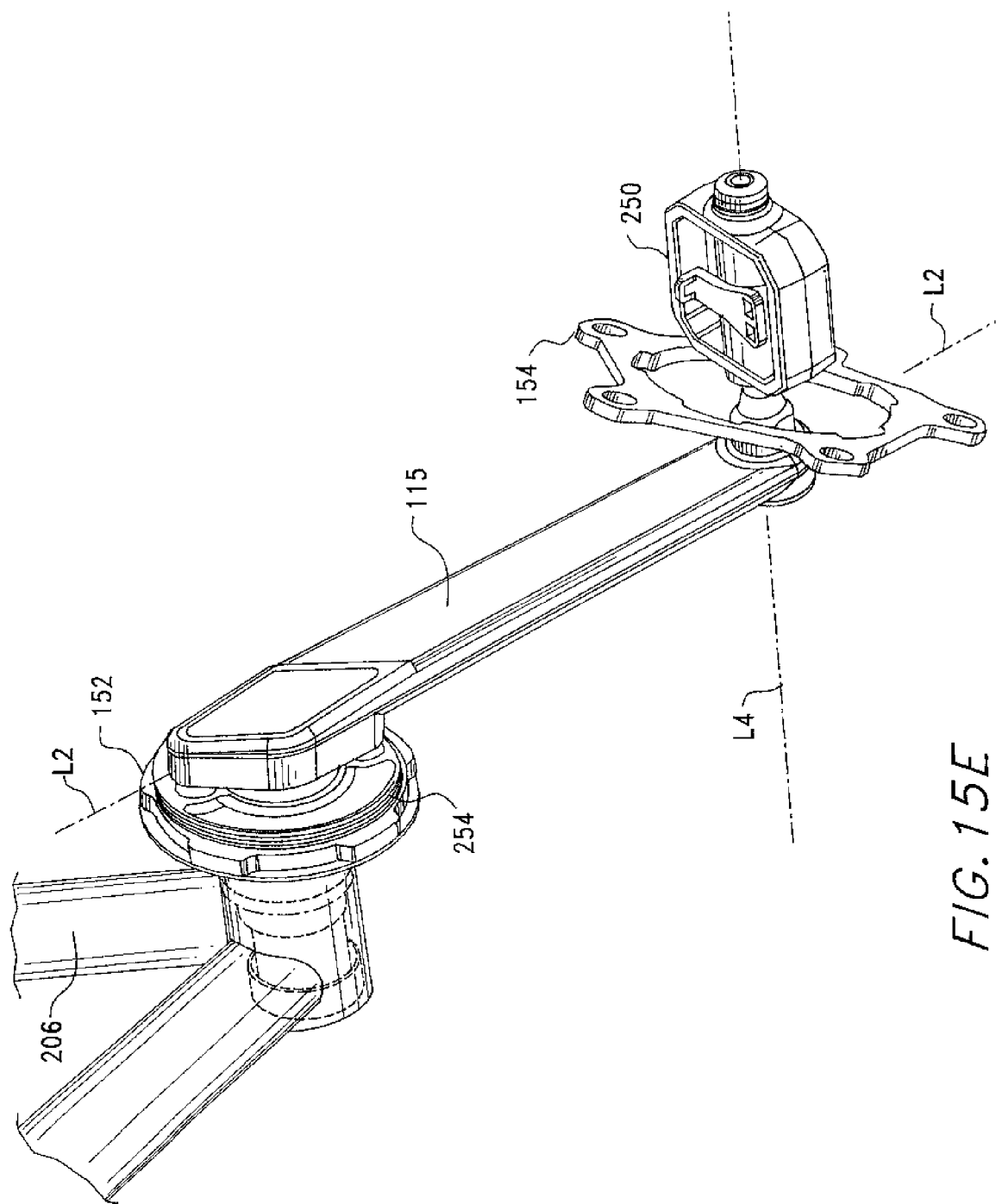

BICYCLE SHOE

This application is a continuation application of copending application Ser. No. 11/517,133 filed Sep. 6, 2006 now U.S. Pat. No. 7,540,101; which is a continuation application of application Ser. No. 10/457,623 filed Jun. 9, 2003 and issued as U.S. Pat. No. 7,104,158 on Sep. 12, 2006; which is a Continuation-in-part application of application Ser. No. 10/038,374 filed on Dec. 31, 2001 and now abandoned; which is a continuation application of application Ser. No. 09/887,754 filed on Jun. 25, 2001 and issued as U.S. Pat. No. 6,543,308 on Apr. 8, 2003; which is a continuation-in-part application of application Ser. No. 09/498,797 filed on Feb. 6, 2000 and issued as U.S. Pat. No. 6,276,234 on Aug. 21, 2001; which is a continuation application of application Ser. No. 09/146,766, filed on Sep. 3, 1998 and issued as U.S. Pat. No. 6,199,449 on Mar. 13, 2001; the disclosures of which are all incorporated herein by reference.

BACKGROUND OF THE INVENTION

The present invention relates generally to bicycle components and more specifically to pedal and pedal to shoe connection assemblies and methods.

Presently, bicycles have grown to a high level of popularity and many bicycles are highly specialized for certain applications. These specialized applications impose extraordinary requirements on various bicycle components. Despite these extraordinary requirements, many of the basic bicycle components have remained relatively unchanged for quite some time. For occasional riders, bicycles in their present form may be sufficient. However, specialty bicycles such as mountain bikes, racing bikes, daily commute bikes, and other specialized bikes have many components that could be significantly improved. One such component is the bicycle crank assembly.

Current crank assemblies are made up of a spindle that is mounted within a bottom bracket of a bicycle frame for rotation about a crank assembly rotational axis. Right and left crank arms are attached to the spindle and right and left pedals are attached to the ends of the right and left crank arms. The crank arms and spindle are often subjected to substantial stresses. Often times the rider has minimal time to react to changing trail or road conditions such as rough terrain or potholes. These jarring trail and road conditions place a heavy burden upon the mechanical integrity of the crank assembly.

The pedals, crank arms, and spindle have the severe task of carrying the majority of the rider's weight, the impact loads caused by rough terrain, as well as transforming the riders leg motions into the torque that propels the rider and the bicycle. Therefore, the crank assembly is subjected to a significant amount of torque. The continuous cranking motion, combined with the high degree of torque, over an extended period of time, causes wear and may eventually lead to the failure of the crank arm and/or the point where the crank arm connects to the spindle.

The most widely accepted crank arm/spindle connection system currently available is a system that utilizes a right and left crank arm, usually made of an aluminum alloy, and a hardened steel or titanium spindle. The spindle has four flats machined at a slight angle on each end of the spindle creating a tapered protruding square. The tapered protruding square usually is about ½" to ⅝" in length. The crank arm has a mating tapered square cavity formed into one end of the crank arm. The attachment of the crank arm to the spindle is achieved by pressing the tapered square cavity of the crank arm over the tapered square protrusion of the spindle. This press fit typically relies on distortion at the points of contact between the crank and the spindle to hold the crank arm engaged with the spindle. A nut or bolt is also typically tightened against the outer portion of the crank arm to hold the crank arm onto the spindle.

While the tapered square configuration may seem at first glance a viable and economical method of attaching the crank arms to the spindle, it suffers in one major area. Although the tapered square may adequately transfer the torque from the rider to drive system, it does not do a very good job of preventing the crank arm from rocking or oscillating on the spindle. This oscillating motion in which the crank arm rocks independently of the spindle occurs because of the excessive, and constantly changing loads imposed on the crank system.

With continued use, the oscillating motion may deform the shape of the tapered square connection system. Once enough deformation occurs, the crank arms become useless. There are shapes other than tapered squares that are currently used to transfer of torque between the crank arm and the spindle such as a spline or a tapered spline. Some include a spline in conjunction with a clamping arrangement that further tightens the splined portion of the crank arm around the mating splined portion of the spindle. Regardless of the shape used in transferring torque from the crank arm through the spindle to the other crank arm, all of the systems could be improved through a system that would eliminate the independent oscillating movement of the crank arms on the spindle.

Additionally, with the tapered square configuration, a crank arm puller is typically required in order to remove the crank arms from the spindle. This is a difficult and time consuming procedure. Many bicyclists are not willing to take on this procedure and therefore this configuration discourages the proper servicing of the spindle components such as spindle bearings. Also, in the case of racing bikes, a broken crank arm or spindle of this type during the course of a race virtually insures that the racer is out of the race due to the time required to change the spindle or crank arm.

The present invention discloses an improved crank arm/spindle connection arrangement that utilizes two spaced apart load bearing surfaces for interconnecting two separate spindle portions. The two spaced apart load bearing surfaces provide a stabilized connection arrangement for interconnecting the two spindle portions. A novel spline arrangement is also disclosed for interconnecting the two spindle portions. This two piece spindle arrangement eliminates the conventional connection points between each of the crank arms and the spindle.

Another problem with conventional crank arm systems is that the chain rings that are driven by the crank arms are typically attached to the inside of the crank arms. Because of this configuration, the crank arm typically needs to be removed in order to remove the chain rings. As mentioned above, since a crank puller is typically required to remove the crank arm, it is difficult to quickly remove and replace a chain ring. The present invention discloses a quick change chain ring arrangement that allows the chain ring to be removed and replaced without requiring the crank arm to be removed.

In conventional crank assemblies, the chain rings are typically fixed to the associated crank arm as mentioned above. Because of this, it can be difficult to properly align the chain rings with other bicycle components such as a front derailleur. Often times, a specialty bike is assembled from components provided by a variety of manufacturers. These manufacturers often have varying spacing and positioning requirements for their components. This further contributes to the difficulties in properly aligning the various components of the bicycle. The present invention discloses a chain ring alignment system that allows the position of the chain rings of the crank assembly to be adjusted along the crank assembly rotational axis.

In many circumstances, it would be desirable to provide crank arms with a larger crank arm radius. This would provide greater leverage to the rider and allow more driving force to be exerted for a given amount of effort from the rider. However, the length of the crank arms of conventional crank assemblies are limited by the ground clearance of the crank arms. Also, as the crank arm radius is increased, the rider must move the pedals around a larger circumference which takes a longer amount of time. This takes away from the leverage benefits provided by longer crank arms. The present invention discloses a variable length crank arm arrangement that allows the crank arm length to be increased during the downward stroke of the crank arm rotation and shortened during the upward stroke. This increases the leverage available to the rider during the downward stroke of the pedal rotation, as would be the case with a longer fixed crank arm. However, the variable length crank arm reduces the distance the pedal is required to travel during a crank assembly rotation compared to a longer fixed crank. Furthermore, the variable length crank arm arrangement may be configured to increase the ground clearance of the crank assembly.

Another problem associated with conventional crank assemblies involves currently available arrangements for connecting a bicycle shoe to a pedal. Typically, bicycle shoes include a clip for attaching the shoe to the pedal. These clips are normally engaged by properly aligning the clip on the shoe with an associated protrusion on one of the flats of the pedal. This arrangement requires the rider to first position the pedal with the protrusion facing up and then align the clip on the shoe with the protrusion before engaging the clip. This can be an awkward procedure that can at times be dangerous. Also, once clipped in, the connection may be difficult to quickly disengage causing potential safety concerns. The present invention discloses a bicycle shoe to pedal connection arrangement that simplifies the process of engaging and disengaging the shoe to pedal connection.

SUMMARY OF THE INVENTION

As will be described in more detail hereinafter, a pedal connection arrangement and method for holding a bicycle rider's foot attached to a bicycle pedal is disclosed. The pedal connection arrangement includes a pedal having a pedal longitudinal axis around which the pedal is intended to rotate. The pedal includes a spherical portion having an outer spherical surface with the spherical portion having an engaging surface. The engaging surface includes at least portions of the outer spherical surface of the spherical portion of the pedal and the spherical portion of the pedal is located along the pedal longitudinal axis such that the pedal has a radially symmetrical cross sectional shape along the pedal longitudinal axis. The pedal connection arrangement also includes a bicycle shoe having a pedal gripping arrangement. The pedal gripping arrangement includes a pedal gripping cavity and the pedal gripping cavity has a shape that is defined by at least a portion of a sphere such that the pedal gripping cavity directly engages at least portions of the outer spherical surface of the spherical portion of the pedal when the pedal gripping arrangement is engaged with the spherical portion of the pedal. This allows the pedal gripping arrangement to be engaged with the spherical portion of the pedal when the pedal is in any position regardless of the rotational position of the pedal about the pedal longitudinal axis. The pedal gripping arrangement is configured in such a way that the pedal gripping arrangement securely grips at least portions of the engaging surface of the spherical portion of the pedal, yet remains free to swivel in various directions about the spherical portion of the pedal to at least a predetermined degree when the pedal gripping arrangement is engaged with the pedal. The various directions include directions other than about the pedal longitudinal axis, thereby giving more flexibility for movement of the rider's foot while maintaining positive contact between the pedal gripping arrangement and the spherical portion of the pedal.

In one embodiment, the pedal includes an attaching arrangement for attaching the pedal to a bicycle crank arm. In this embodiment, the attaching arrangement cooperates with the pedal gripping arrangement to provide an arrangement for limiting the degree to which the pedal gripping arrangement is able to swivel about an axis that is perpendicular to the pedal longitudinal axis.

In another embodiment, the pedal includes a first end configured for attaching the pedal to a bicycle crank arm, a second end, and a central portion located between the first and second ends. In this embodiment, the spherical portion of the pedal is intersected by a cylindrical portion that extends entirely through the spherical portion of the pedal such that the spherical portion is located at the central portion of the pedal and the cylindrical portion extends to the second end of the pedal. With this configuration, the cylindrical portion may be used to cooperate with the pedal gripping arrangement to providing an arrangement for limiting the degree to which the pedal gripping arrangement is able to swivel about an axis that is perpendicular to the pedal longitudinal axis The pedal gripping arrangement may be an independently formed gripping device that is attached to the bicycle shoe. Alternatively, the pedal gripping arrangement may be formed as part of the bicycle shoe. Also, the pedal gripping arrangement may be made from a pliable material that allows a rider to release the shoe from the pedal by bending their toes up out of a natural relaxed position causing the pedal gripping arrangement to flex thereby expanding the pedal gripping arrangement and causing the pedal gripping arrangement to release the pedal. Using a pliable material also allows the rider to more tightly grip the pedal by bending their toes down out of a natural relaxed position causing the pedal gripping arrangement to flex thereby compressing the pedal gripping arrangement and causing the pedal gripping arrangement to more tightly grip the pedal. Alternatively, the pedal gripping arrangement may be hinged adjacent to the pedal gripping arrangement such that a rider is able to release the shoe from the pedal by bending their toes up out of a natural relaxed position causing the pedal gripping arrangement to expand and release the pedal. The shoe may further include a biasing arrangement for biasing the pedal gripping arrangement into a position that grips the pedal when the rider's foot is in a natural relaxed position.

BRIEF DESCRIPTION OF THE DRAWINGS

The features of the present invention may best be understood by reference to the following description of the presently preferred embodiments together with the accompanying drawings in which:

FIG. 4 is a cross sectional view of the spindle portions of the crank arm assembly of FIG. 1 taken along section 4-4.

FIG. 5 is a partially exploded and partially cut away view of the crank arm assembly of FIG. 1 illustrating one embodiment of a connection device for connecting the spindle portions.

FIG. 12 C is a perspective view of the bicycle shoe of FIG. 12B illustrating a hinging feature of this embodiment.

FIG. 13 is a cross sectional perspective view of one embodiment of a splined bearing cartridge assembly designed in accordance with the invention.

FIGS. 15A-E are partially cut away perspective views of the bicycle crank arm assembly of FIG. 1 illustrating the removal of the quick change chain ring support in accordance with the present invention.

DETAILED DESCRIPTION

An invention is described for providing an improved bicycle crank. In the following description, numerous specific details are set forth in order to provide a thorough understanding of the present invention. It will be obvious, however, to one skilled in the art, that the present invention may be embodied in a wide variety of specific configurations. Also, well known bicycle components and hardware have not been described in detail in order not to unnecessarily obscure the present invention.

Figure 1:
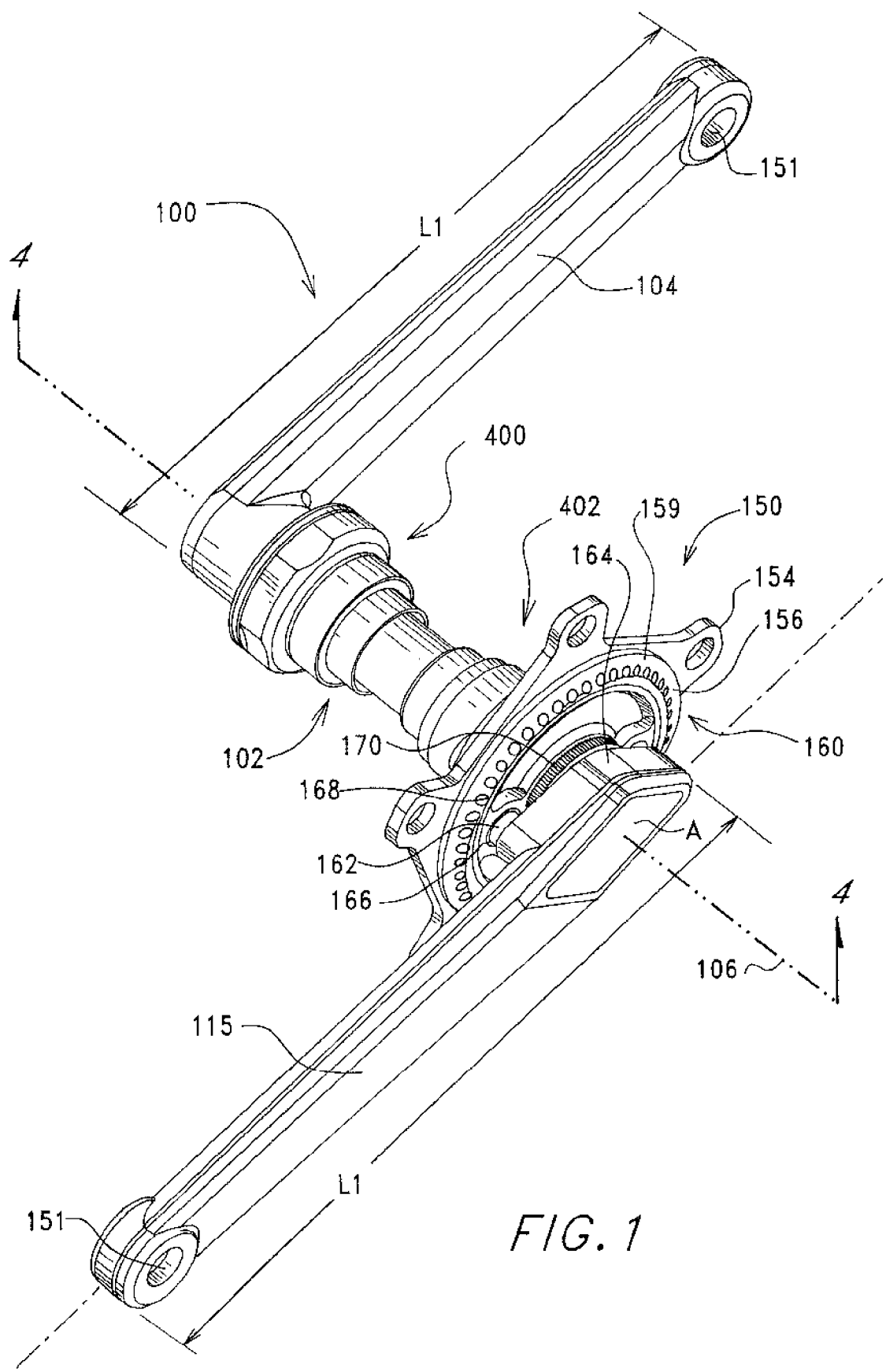
FIG. 1 is a diagrammatic perspective view of a first embodiment of a bicycle crank arm assembly designed in accordance with the invention.
Figure 2:
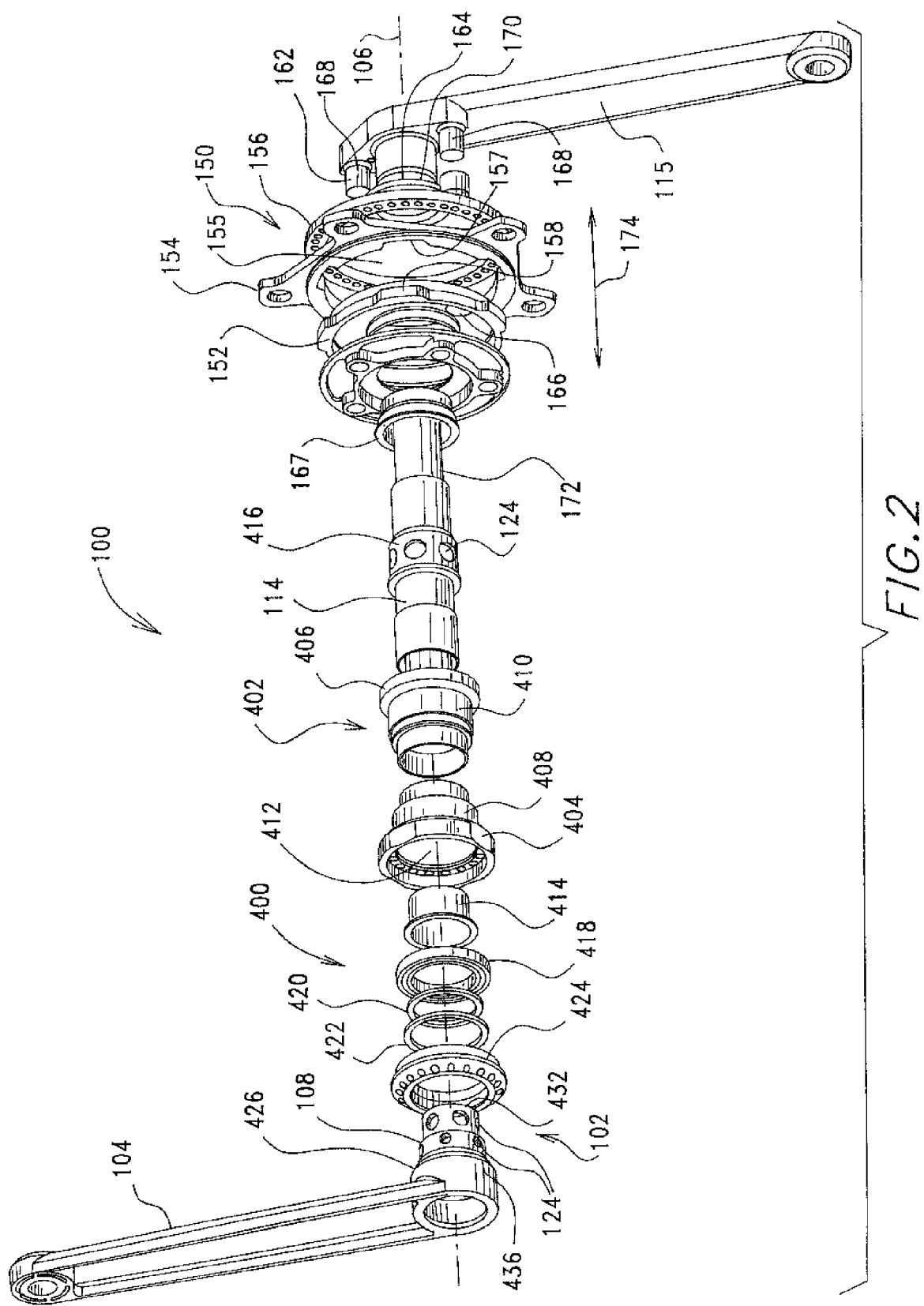
FIG. 2 is exploded view of the crank arm assembly of FIG. 1.
Figure 3:
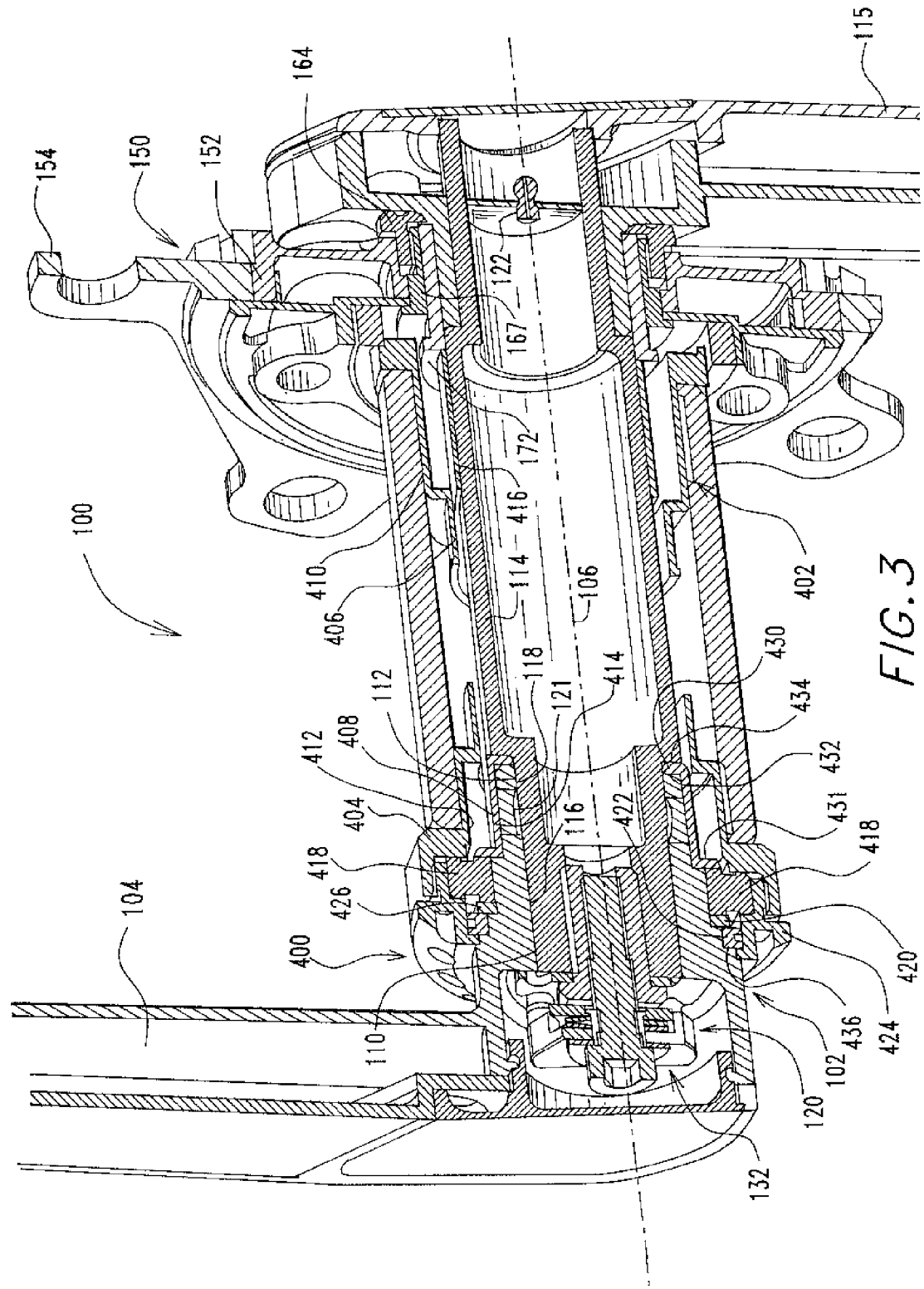
FIG. 3 is a cross sectional view of the crank arm assembly of FIG. 1 taken along section 4-4.

Turning to the drawings, wherein like components are designated by like reference numerals throughout the various figures, attention is initially directed to FIGS. 1-4. These figures illustrate a various views of a first embodiment of a crank arm assembly 100 designed in accordance with the invention. FIG. 1 is a perspective view of the assembly, FIG. 2 is an exploded view of the assembly, FIG. 3 is a cross sectional view of the assembly, and FIG. 4 is a cross sectional detail view of the spindle portions of the assembly.

Crank arm assembly 100 includes a spindle connection arrangement 102 for connecting a crank arm 104 to bicycle crank arm assembly 100. Spindle connection arrangement 102 is also used to connect crank arm assembly 100 to a bicycle frame along a spindle rotational axis 106 around which crank arm assembly 100 is intended to rotate when spindle connection arrangement 102 is connected to a bicycle frame.

Spindle connection arrangement 102 includes a first spindle portion 108, shown in FIGS. 2-4, fixed to and extending outward from crank arm 104 along spindle rotational axis 106. First spindle portion 108 has two load bearing surfaces 110 and 112, shown in FIGS. 3 and 4, that are spaced apart from one another along the length of spindle rotational axis 106. A second spindle portion 114 also has two load bearing surfaces 116 and 118 that are spaced apart from one another along spindle rotational axis 106. As shown best in FIGS. 3 and 4, second spindle portion 114 is configured to concentrically mate with first spindle portion 108 about spindle rotational axis 106. In the embodiment shown, second spindle portion 114 is provided as a spindle portion that extends outwardly from a second crank arm 115.

As will be described in more detail hereinafter, spindle connection arrangement 102 also includes a connection device 120 (shown in FIG. 3) that connects first spindle portion 108 to second spindle portion 114 such that the two load bearing surfaces 110 and 112 of first spindle portion 108 each engage an associated one of the two load bearing surfaces 116 and 118 of second spindle portion 114. The two pairs of engaging, spaced apart, load bearing surfaces provide interconnecting surfaces for connecting the first and second spindle portions. These two spaced apart load bearing surfaces prevent one spindle portion from oscillating independently from the other and prevent the spindle portions from becoming misaligned from one another when the two spindle portions are connected using connection device 120.

In the embodiment shown, load bearing surfaces 110 and 116 are spaced apart from load bearing surfaces 112 and 118 by an air gap 121 that ensures these two pairs of mating surfaces form two spaced apart load bearing, engaging surfaces. Although these load bearing surfaces are shown as being separated by an air gap, this is not a requirement of the invention. Instead, the present invention would equally apply so long as the two load bearing portions of the load bearing surfaces are spaced apart from one another.

The two spaced apart load bearing surfaces, referred to hereinafter as two point stabilization, eliminates the conventional connection between a crank arm and spindle. This two point stabilization approach creates and maintains a secure connection between the crank arm and the spindle. Because the loads imposed on the crank system are distributed over, and shared by two separate, spaced apart load bearing surfaces, the two point stabilization approach provides a much more reliable crank arm/spindle connection arrangement compared to conventional methods of connecting a crank arm to a spindle.

A spindle connection arrangement in accordance with the invention provides the additional benefit that this arrangement may be provided at a lighter weight than conventional spindle configurations without sacrificing strength and durability. This is because the loads imposed on the spindle by the crank arms are distributed over the two spaced apart bearing surfaces rather than being concentrated on the tapered square protrusion of conventional crank arm spindles. Also, because the second spindle portion 114 may be provided as a tube extending from the second crank arm 115 as illustrated in FIG. 3, a grease fitting 122 and grease ports 124 (shown best in FIG. 2) may be easily incorporated into the design. The grease ports 124 could be positioned to provide grease to all of the moving parts of the assembly without sacrificing the strength of the connection arrangement. This would allow regular servicing of the moving parts within the crank assembly without requiring the disassembly of the crank assembly.

Although the spindle connection arrangement illustrated in FIGS. 1-4 uses two spindle portions with one portion extending from each of the crank arms, this is not a requirement of the invention. Instead, this arrangement could include a three piece spindle. In this case, both of the crank arms would have a spindle portion similar to spindle portion 108 extending from the crank arm along the spindle rotational axis. Each of these crank arm spindle portions would attach to a separate, third spindle portion using the two point stabilization approach described above.

Figure 6A:
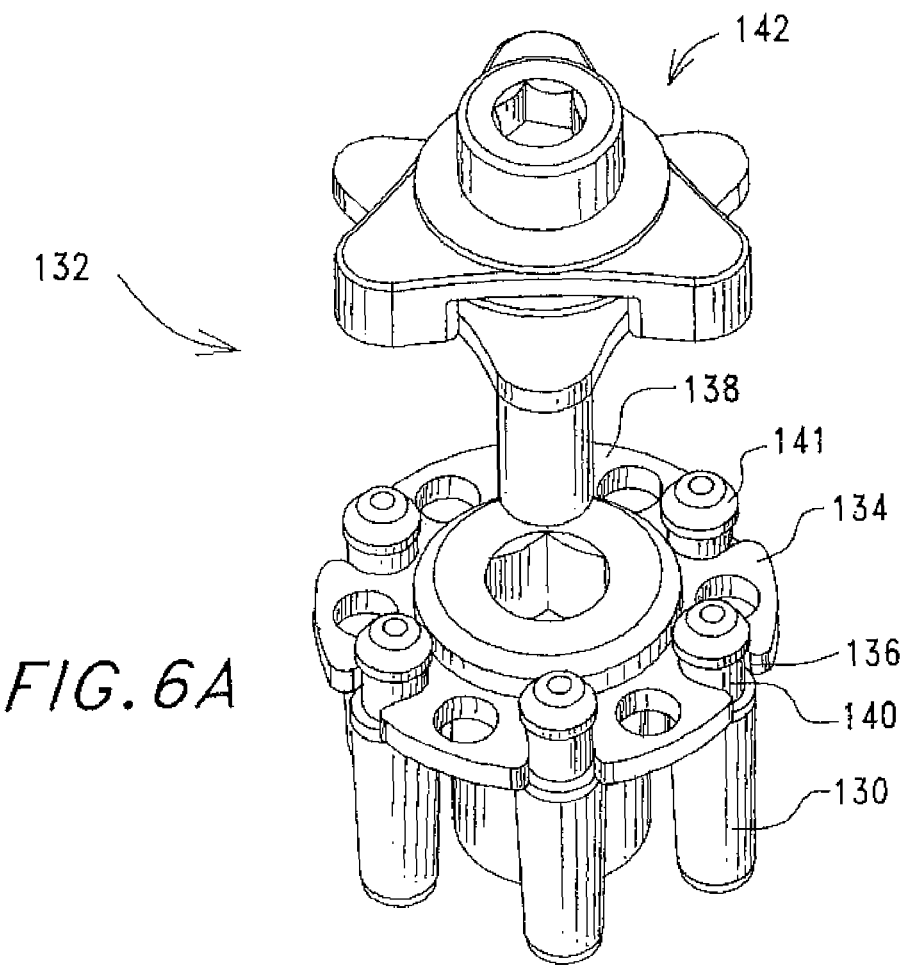
FIG. 6A is a partially exploded view of one embodiment of a tapered pin retention device in accordance with the invention.
Figure 6B:
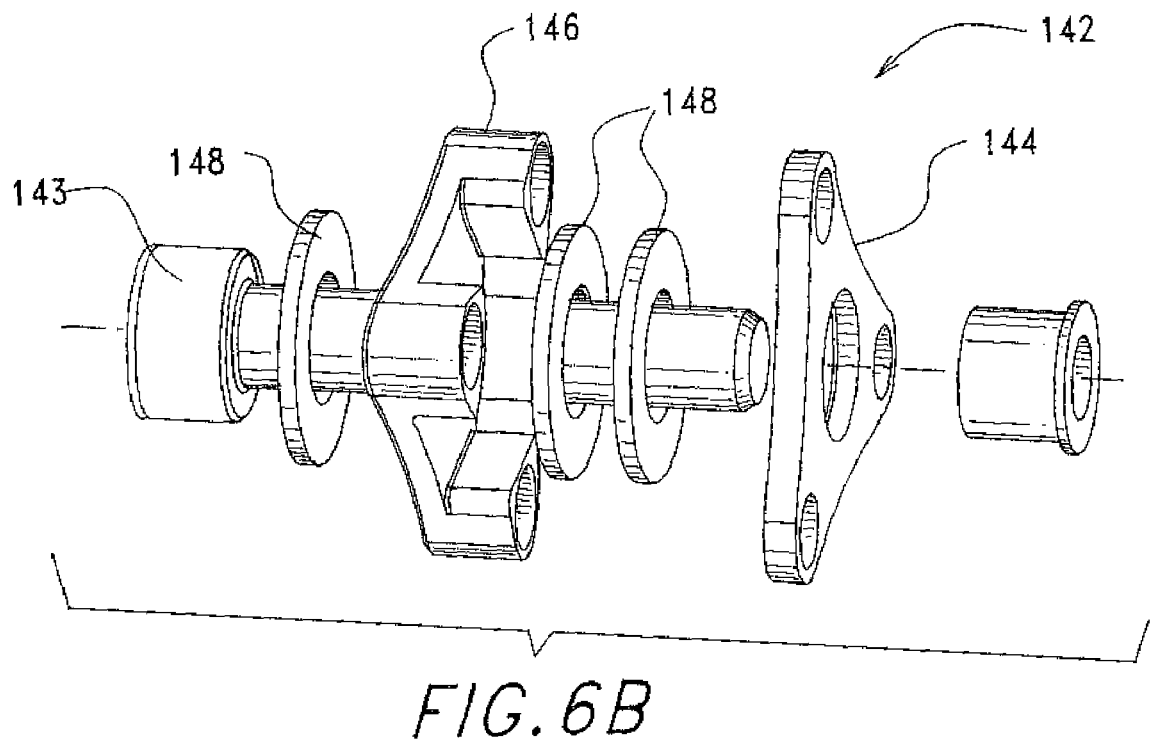
FIG. 6B is an exploded view of one embodiment of a biasing arrangement in accordance with the invention for exerting an equal amount of pressure on each of the tapered pins of the tapered pin retaining device of FIG. 6A.
Figure 7:
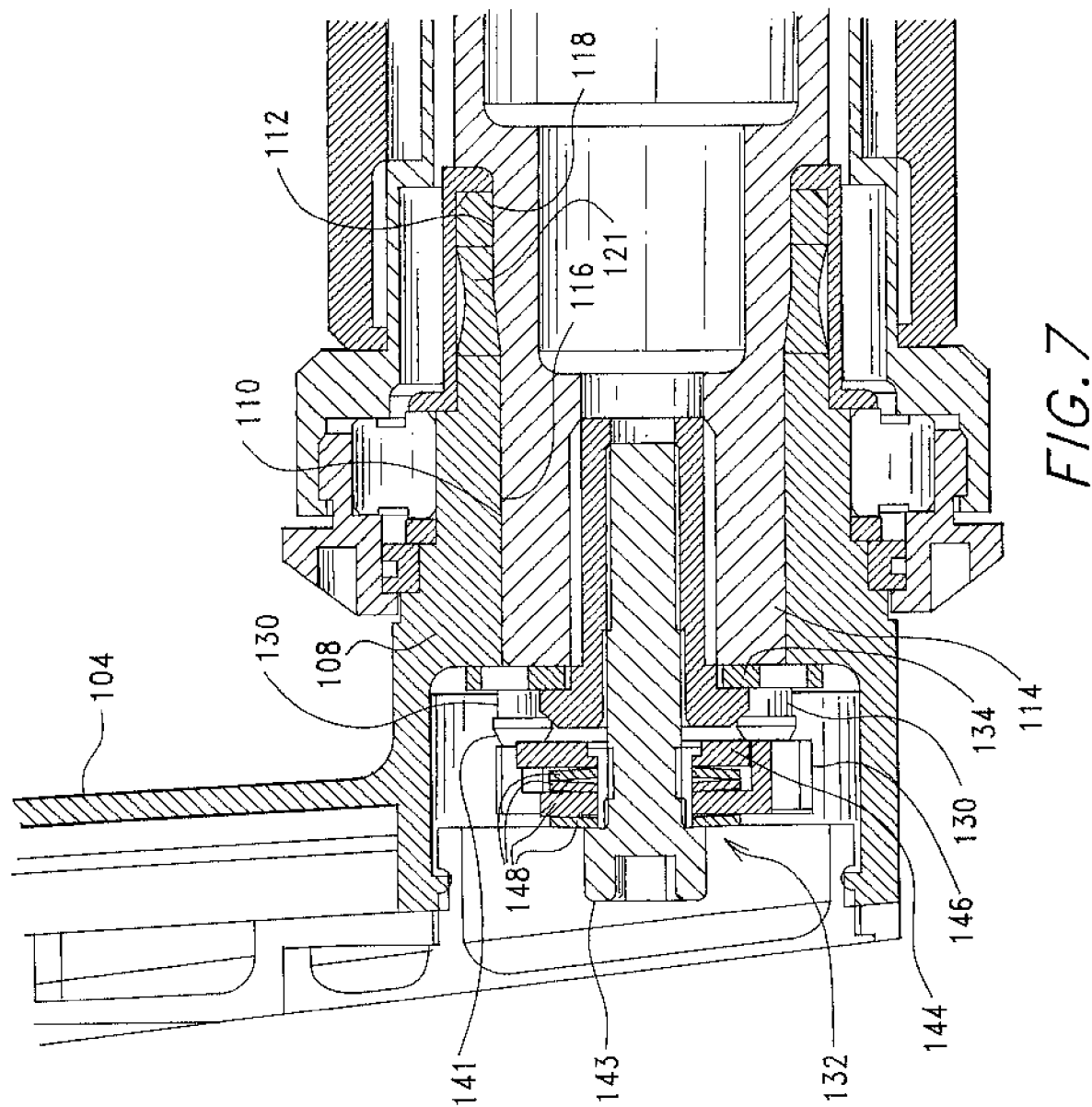
FIG. 7 is a cross sectional view of connection device of FIG. 5.

Referring now to FIGS. 5-7, a spline arrangement for connecting spindle portions 108 and 114 of crank assembly 100 will be described. In accordance with one aspect of the invention, spindle connection arrangement 102 includes at least one tapered bore 126 formed into one of the pairs of load bearing surfaces of spindle connection arrangement 102. In the embodiment shown in FIG. 5, six tapered bores 126 are formed into load bearing surfaces 110 and 116. Each of the tapered bores has a longitudinal axis that extends along the engaging load bearing surface 110 of first portion 108 and surface 116 of second spindle portion 114. Approximately half of tapered bores 126 (indicated by reference numeral 126a in FIG. 5) are formed longitudinally into load bearing surface 110 of spindle portion 108 and the other half of tapered bores 126 (indicated by reference numeral 126b in FIG. 5) are formed longitudinally into load bearing surface 116 of spindle portion 114.

In this embodiment, connection device 120 takes the form of a replaceable spline device 128. Spline device 128 includes at least one tapered pin 130 held in an associated tapered bore 126 so as to prevent crank arm 104 from rotating independently of spindle portion 114. In the embodiment being described, spline device 128 includes six tapered pins 130. Spline device 128 also includes a tapered pin retention device 132, which will be described in more detail hereinafter, for holding tapered pins 130 within tapered bores 126. Although spline device 128 is described as including six tapered pins, this is not a requirement of the invention. Instead, it should be understood that any number of tapered pins may be used and still remain within the scope of the invention.

One of the main advantages of the tapered pin spline arrangement is that the tapered pin spline mechanism is extremely simple and cost effective to manufacture compared to other conventional spline arrangements. The boring operation required to bore the tapered bores can be performed with a simple drilling or milling machine and a rotary table. The tapered pins can be run on a screw machine lathe cost effectively. Therefore, sophisticated machining equipment is not required in order to produce a tapered pin spline arrangement. This reduces the cost of producing this type of spline arrangement.

Another advantage of the tapered pin spline arrangement is that tapered pins 126 can be made from a lower strength material than the surrounding area of the spindle portions. With this configuration, the tapered pins are able to act as fuses in the event of an overload of stress applied to the crank set by shearing before permanent damage occurs to the spindle portions. Replacement tapered pins could be provided to the bike owner at significantly less cost than the cost of replacing the entire crank set which is required when conventional crank sets fail.

Although connection device 120 has been described as being spline device 128, this is not a requirement of the invention. Instead, any conventional connection device such as a bolt or a threaded stud may be used to hold spindle portion 108 engaged with spindle portion 114 and still remain within the scope of the invention so long as spindle portions 108 and 114 have two spaced apart bearing surfaces as described above.

In the embodiment described above, the number of tapered bores and associated tapered pins is a multiple of three. This allows the use of a tapered pin retaining device 132 in accordance with the invention. As illustrated in FIGS. 5 and 6A, one embodiment of tapered pin retention device 132 includes a washer 134 having holes or openings 136 cut into a peripheral edge portion 138 of washer 134. Openings 136 are formed such that the outside diameter of the openings are a size that allows tapered pins 130 to be pressed into the openings and retained by washer 134. This allows tapered pins 130 to be simultaneously inserted into tapered bores 126 for ease of assembly.

In the embodiment shown, the portions of tapered pins 130 that are pressed into opening 136 have a slightly smaller diameter than the remainder of tapered pins 130. This smaller diameter, indicated by reference numeral 140, assists in holding tapered pins captured within openings 136. Also, the smaller diameter portions 140 of tapered pins 130 extend along the length of tapered pins 130 for a distance greater than the thickness of washer 134. This allows some freedom of movement for the pins within the washer along the longitudinal axis of the tapered pins. This also forms heads 141 on tapered pins 130 at the ends of tapered pins 130 that are opposite the ends of the tapered pins that are inserted into tapered bores 126. As will be described immediately hereafter, this freedom of movement along the longitudinal axis of the tapered pins helps allow tapered pins 130 to be held within tapered bores 126 with equal amounts of pressure on each tapered pin.

Referring now to FIGS. 6A and 6B, a biasing arrangement 142 designed in accordance with the invention will be described. In the embodiment shown, tapered pin retention device 132 also includes a biasing arrangement 142 for placing an equal amount of pressure on each of heads 141 of tapered pins 130. Biasing arrangement 142 includes a fastener 143, such as a bolt, that is used to draw biasing arrangement 142 against heads 141 of tapered pins 130. Biasing arrangement 142 also includes a triangular shaped piece for every three tapered pins. In this case, since six tapered pins are used, two triangular pieces 144 and 146 are used. Triangular shaped piece 144 and 146 are separated by two Belleville spring washers 148. Triangular piece 146 and the head of fastener 143 are also separated by a Belleville spring washer 148. Washers 148 are sloped, as shown best in FIG. 7, so as to allow triangular pieces 144 and 146 some degree of freedom to wobble relative to the longitudinal axis of fastener 143 which, in this case, coincides with the spindle rotational axis 106. This helps allows triangular pieces 144 and 146 to exert an equal amount of pressure on each tapered pin.

As illustrated in FIG. 6B, triangular piece 146 has protrusions at the corners that act as locators for triangular piece 144 which has no protrusions. This keeps the triangular pieces aligned with respect to the spacing of the tapered pins. Therefore, only one step is required to align the triangles with the heads of the tapered pins.

The reason for the triangles is to assure that equal pressure is placed on all pins. Since three points define a plane, theoretically, if three pins were slightly higher than the rest, these three pins would receive the majority of the pressure if a simple bolt and washer were used to compress all six of the tapered pins. This may not be a problem if only three tapered pins were used, however, the triangular shape still directs bolt pressure better than a conventional washer and is easier to position properly on the tapered pins.

Biasing arrangement 142 is designed so that triangular piece 144 will touch its three tapered pins first since it is originally slightly closer to the heads of the pins than triangular piece 146. Spring washers 148 take up the slack and put pressure on triangular piece 144 until the two triangular pieces share the same approximate level. As fastener 143 is tightened further, both triangles are then under pressure. Both triangular pieces, while they get there pressure from the same bolt, are able to rock independently of each other to adjust to slight tapered pin height variations because of the Belleville spring washers. The spring washers also apply back pressure on the head of fastener 143 which helps prevent it from loosening on its own. With this arrangement, all of the tapered pins receive substantially an equal amount of pressure, thereby insuring that each of the tapered pins is held firmly within tapered bores 126.

Although tapered pin retention device 132 is described as including biasing arrangement 142 and washer 134 for holding pins 130 together, these components are not requirements of the invention. Instead, any appropriate pin retention mechanism may be utilized to hold tapered pins 130 within tapered bores 126 and still remain within the scope of the invention.

Although the above described spline device 128 has been described as being used to connect the two spindle portions of a bicycle crank arm assembly, it should be understood that this novel spline arrangement may be used to connect a wide variety of rotational members. For example, in another embodiment of the invention, the above described spline device is used in a spline arrangement for interconnecting a drive member and a driven member such that the drive member is able to rotationally drive the driven member about a given rotational axis. Using the example of the above described spindle arrangement, the drive member may be the first spindle portion 108 protruding from crank arm 104 and the driven member may be second spline portion 114.

Referring back to FIGS. 1-3, a quick change chain ring arrangement 150 in accordance with the invention for use on a bicycle crank arm assembly such as crank assembly 100 will be described. As mentioned above, crank arm assembly 100 includes two crank arms 104 and 115 that rotate about spindle rotational axis 106 Each crank arm includes a pedal mounting point 151 for receiving a pedal (not shown in FIGS. 1-3). The crank arms have a crank arm length L1 extending from the end of the crank arm that attaches to the spindle to the end of the crank arm in which pedal mounting point 151 is located. Each crank arm defines a crank arm longitudinal axis L2. The crank arms have a cross sectional shape along the crank arm length perpendicular to the crank arm longitudinal axis. This cross sectional shape defines a maximum cross sectional area perpendicular to the longitudinal axis of the crank arm. In the case of crank arm 115, this maximum cross sectional area is located at point A along crank arm length L1 where the crank arm intersects with spindle rotational axis 106.

As best shown in FIG. 2, quick change chain ring arrangement 150 includes a chain ring adapter 152 that attaches to crank assembly 100 such that adapter 152 rotates with the crank assembly about spindle rotational axis 106. A removable chain ring support 154 is engaged with chain ring adapter 152. Chain ring support 154 has an inside diameter large enough that it may be removed from the bicycle without requiring the removal of the crank arm. That is, chain ring support 154 has a minimum inside opening 155 formed into chain ring support 154 that is larger than the maximum cross sectional area of the crank arms located at point A. This allows chain ring support 154 to be installed onto and removed from the crank assembly without requiring the removal of the crank arms from the crank assembly and without requiring the removal of the crank assembly from the bicycle frame. A removable connecting device 156 retains removable chain ring support 154 on chain ring adapter 152. As will be described in more detail hereinafter, inside opening 155 of chain ring support 154 may also be made large enough that it will fit around a pedal that is installed in pedal mounting point 151 thereby allowing chain ring support 154 to be removed from the crank assembly without requiring the pedals to be removed.

In accordance with the invention, chain ring support 154 has a shape that allows the chain ring support to mate with chain ring adapter 152 so that torque may be transmitted between chain ring adapter 152 and chain ring support 154 about crank assembly or spindle rotational axis 106 without requiring the use of fasteners or other load bearing devices to transmit the torque between chain ring adapter 152 and chain ring support 154. In the embodiment illustrated in FIGS. 1-3, inside opening 155 of chain ring support 154 has a splined shape 157 and the chain ring adapted has a mating splined shape 158 (shown best in FIG. 2) for mating with a splined shape 157 of the chain ring support. This interlocking configuration allows torque to be transmitted about the crank assembly rotational axis between the chain ring adapter and the chain ring support without requiring the use of fasteners or other load bearing devices to transmit the torque between the chain ring adapter and the chain ring support. This arrangement provides the benefit that the chain ring adapter may be driven in a rotational manner by the splined chain ring support about the crank assembly rotational axis, yet is free to be easily removed when pulled in a direction parallel with the crank assembly rotational axis.

Although chain ring adapter 152 and chain ring support 154 have been described as having mating splined shapes, this is not a requirement of the invention. Instead, it should be understood that shapes other than a splined shape may be used to provide torque transmitting, mating surfaces between the chain ring adapter and the chain ring support. Any desired shape may be utilized and still remain within the scope of the invention so long as the shape provides the required torque transmitting characteristics about the spindle or crank arm rotational axis.

As mentioned above, quick change chain ring arrangement 150 also includes removable retaining device 156 that retains removable chain ring support 154 engaged with chain ring adapter 152. In the embodiment shown in FIGS. 1-3, removable retaining device 156 is a removable threaded ring that threads onto the splined adapter in a manner that holds chain ring support 154 aligned with the splined adapter 154. This allows threaded ring 156 to hold the spline shape 157 of chain ring support 154 engaged with splined shape 158 of chain ring adapter 152 and prevents movement of chain ring support 154 in a direction parallel to crank assembly or spindle rotational axis 106. Because threaded ring 156 is not used to transmit torque between chain ring adapter 152 and chain ring support 154, and because there are not substantial forces exerted axially on chain ring support 154 parallel with spindle rotational axis 106, threaded ring 156 does not need to be torqued tightly against chain ring support 154. Instead, threaded ring 156 only needs to be tightened to the extent that it does not come lose due to normal vibration during the use of the bicycle. This means that threaded ring 156 may be configured such that it only needs to be tightened by hand without requiring the use of tools to torque threaded ring 156 against chain ring support 154. With this configuration, the chain ring support of the present invention may be changed very quickly, without requiring the use of any tools.

In the embodiment shown, removable threaded ring 156 also has an inside diameter D (shown best in FIG. 15A) larger than the maximum cross sectional area of the crank arms and the pedals. As was described above for chain ring support 154, this allows removable threaded ring 156 to be removed from the bicycle crank assembly without requiring the removal of the crank arms or pedals and without requiring the removal of the crank assembly from the bicycle frame. In order to facilitate the easy removal of threaded ring 156, threaded ring 156 may further include a gripping arrangement 159 for allowing the threaded ring to be removed by hand without requiring the use of any tools. As illustrated in FIG. 1, gripping arrangement 159 takes the form of a textured surface on the exposed surface of threaded ring 156.

Referring now to FIGS. 15A-E, the process of removing and replacing chain ring support 154 will be described in detail. As shown in FIGS. 15B-E and in accordance with one embodiment of the invention, chain ring support 154 may be removed without requiring the removal of the crank arms or pedals (indicated by reference numerals 250) from the crank arm assembly and without requiring the removal of the crank arm assembly from the bicycle (represented in FIGS. 15A-E by partially cut away bicycle frame 206).

Figure 15A:
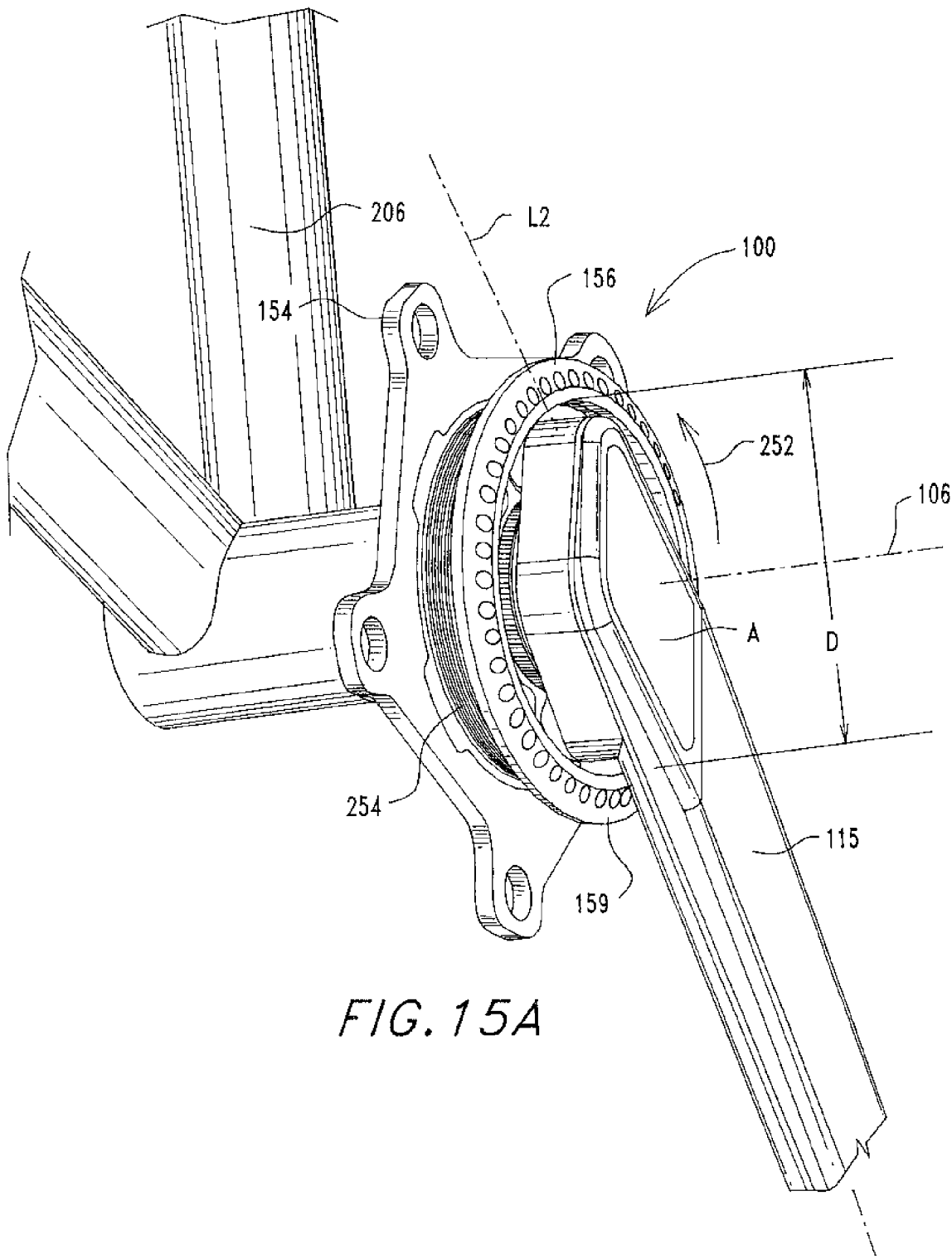
Figure 15B:
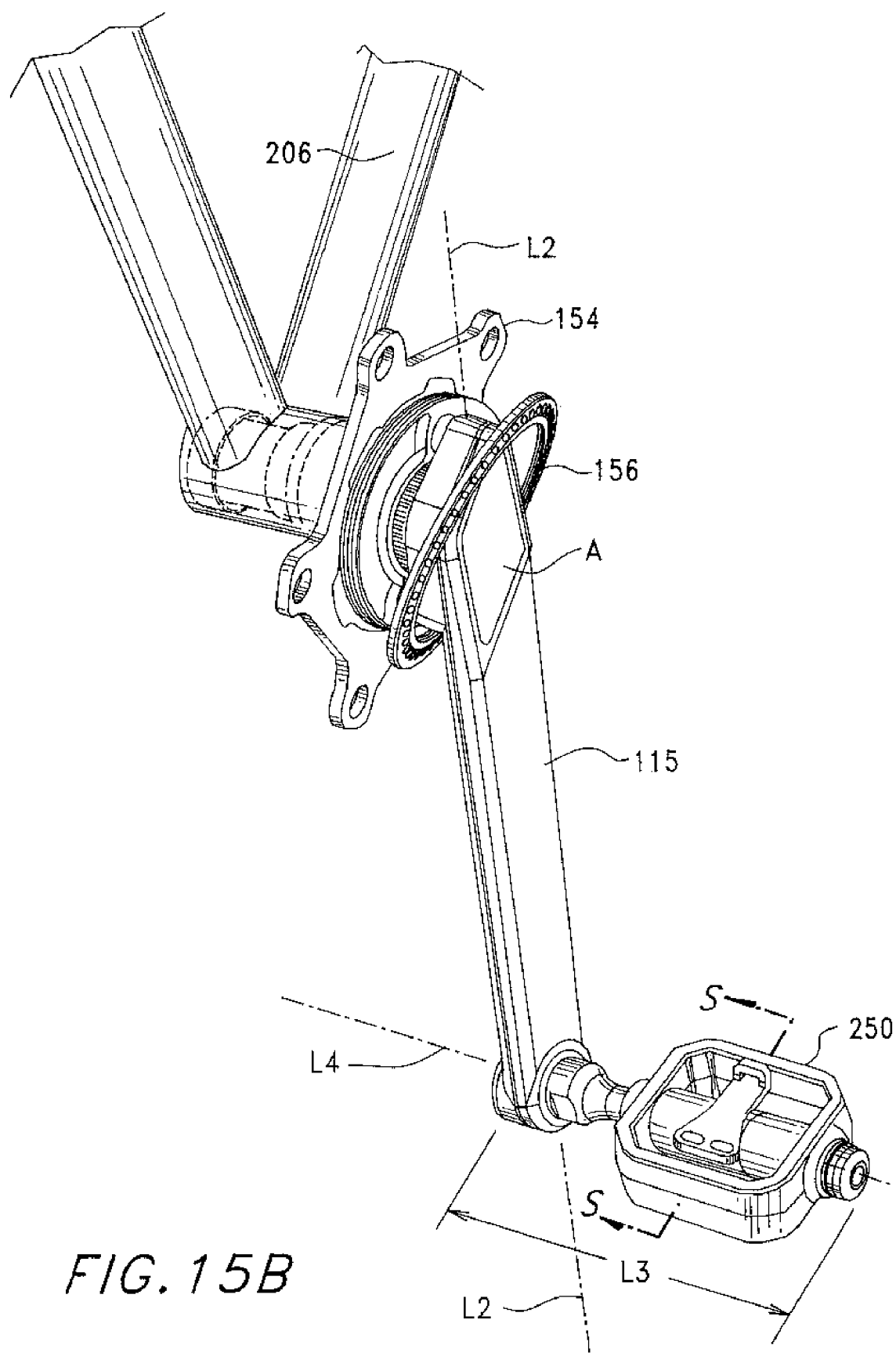

As illustrated in FIG. 15B, pedal 250 has a pedal length L3 that defines a pedal longitudinal axis L4 around which the pedal is intended to rotate. Pedal 250 has a cross sectional shape perpendicular to pedal longitudinal axis L4 that defines a maximum cross sectional area perpendicular to the longitudinal axis. In the example illustrated in FIG. 15B this maximum cross sectional area perpendicular to longitudinal axis L4 exists along the length of the main body of the pedal and may be represented by the cross section that would be obtained by taking a section of pedal 250 through section line S-S.

In the embodiment shown in FIGS. 15A-E, the assembly includes chain ring adapter 152 that is connected to and rotates with crank assembly 100 about crank assembly or spindle rotational axis 106. Removable chain ring support 154 is also provided and it removably engages with chain ring adapter 152. As described above, chain ring support 154 has a minimum inside opening 155 formed into the chain ring support that is larger than the maximum cross sectional area of crank arm 115. As also described above, chain ring support 156 has a shape that allows the chain ring support to mate with chain ring adapter 152 so that torque may be transmitted between the chain ring adapter and the chain ring support about crank assembly rotational axis 106 without requiring the use of fasteners or other load bearing devices to transmit the torque between the chain ring adapter and the chain ring support. Removable retaining device 156 is also provided for retaining removable chain ring support 154 engaged with chain ring adapter 152.

Figure 15C:
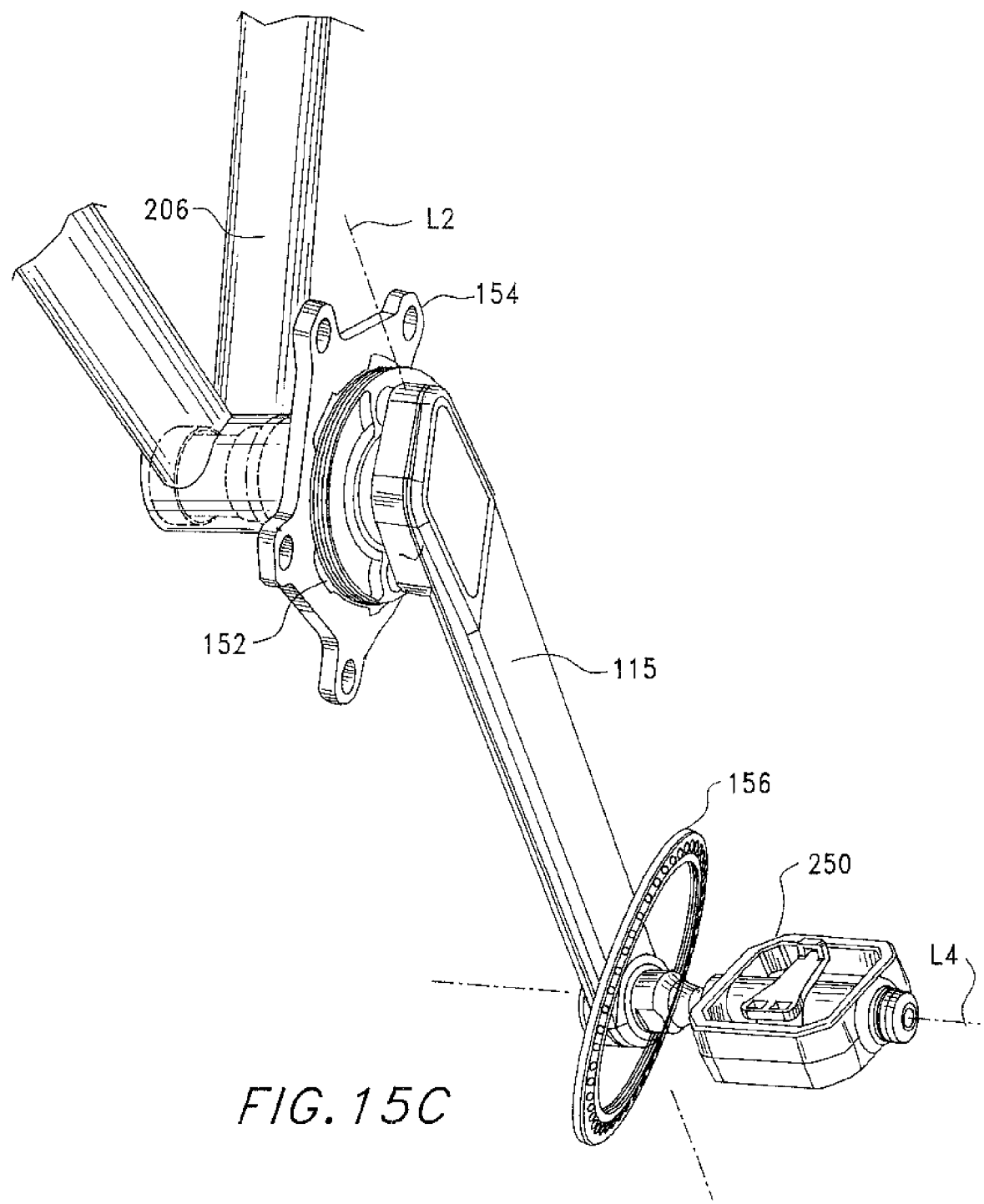

In this embodiment, removable retaining device 156 is first removed. This is accomplished by unscrewing threaded ring 156, the retaining device of this embodiment, from a threaded portion 254 of chain ring adapter 152. Because threaded ring 156 has a large inside diameter D, it may be pivoted around the spindle end of crank arm 115 at point A so that it can be slid along the length of crank arm 115 as shown in FIG. 5B. Once threaded ring 156 has been pivoted around point A and slid along the length of crank arm 115, it is pivoted around the pedal end of crank arm 115 at the point that crank arm 115 and pedal 250 are connected as illustrated in FIG. 15C. Again, since threaded ring 156 has a large inside diameter, it may be slid along the length of pedal 250 and removed from the assembly.

Removable chain ring support 154 may now be removed in a manner similar to that described above for threaded ring 156. Again, because chain ring support 154 is formed with large opening 155, chain ring support 154 may be removed by manipulating chain ring support 154 around point A at the spindle end of crank arm 115, sliding it along the length of the crank arm, pivoting it around the point at which pedal 250 is connected to crank arm 115, and finally sliding chain ring support 154 over the length of pedal 250 as illustrated in FIGS. 15D and 15E. The removable chain ring support may then be replaced with a replacement chain ring support by performing the same steps described above in the reverse order and as illustrated by viewing FIGS. 15A-E in reverse order.

Figure 16:
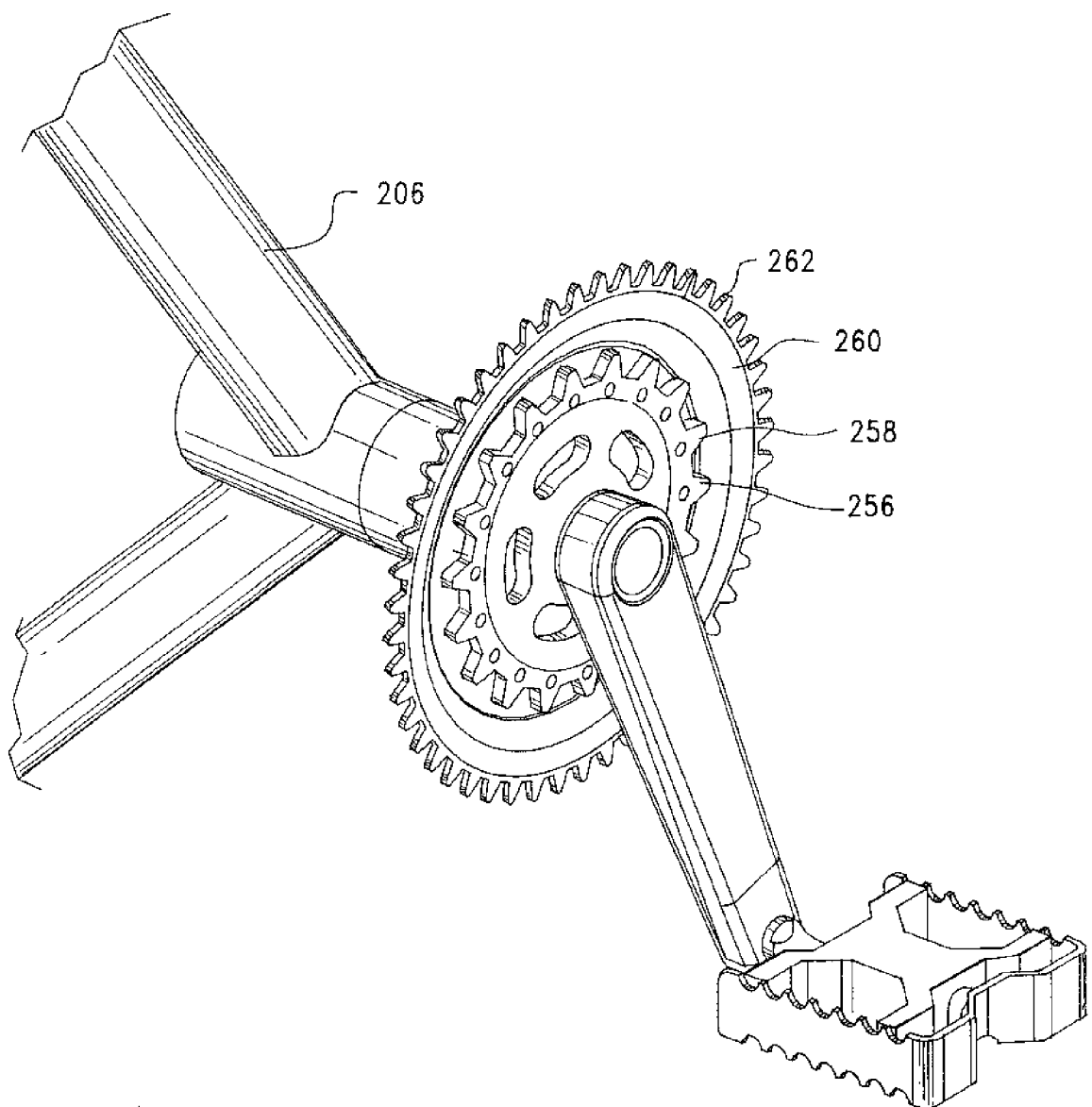
FIG. 16 is a partially cut away perspective view of another embodiment of a quick change chain ring arrangement in accordance with the present invention.

FIG. 16 illustrates some variations on the above described embodiment. As described above, this embodiment includes splined chain ring adapter 152 (not shown). However, the crank assembly includes threaded ring 256 with protrusions 258 and chain ring support 260 to replace chain ring support 154 and threaded ring 156 of the previous embodiments. Threaded ring 256 provides the function of the chain ring support retaining device in a manner similar to that described above for threaded ring 156. However, in this example, threaded ring 256 includes protrusions 258 that are designed to provide a more substantial gripping arrangement compared to the gripping arrangement described above. Because of the large diameter of threaded ring 256, and because of the large gripping protrusions 258 extending out from threaded ring 256, threaded ring 256 may be easily removed by hand without requiring the use of a tool.

Chain ring support 260 includes a splined opening similar to that described above for chain ring support 154 and is designed to engage with chain ring adapter 152 in the same way that was previously described. As mentioned above, because threaded ring 256 is designed to only hold chain ring support 260 engaged with chain ring adapter 152, threaded ring 256 does not need to be overly tightened in order to retain chain ring support 260 engaged with chain ring adapter 152.

Chain ring support 260 further includes an actual chain ring 262 formed as an integral part of chain ring support 260. It should also be understood that additional chain rings may be attached to chain ring support 260 in order to provide multiple chain rings if desired.

In the embodiment illustrated in FIGS. 1-3, quick change chain ring arrangement 150 uses a splined chain ring adapter 152 that attaches to crank assembly 100 such that the splined adapter rotates with the crank assembly about spindle rotational axis 106. Chain ring support 154 has a spline shape that mates with splined adapter 152 such that chain ring support 154 is driven in a rotational manner by splined chain ring adapter 152 about spindle rotational axis 106. In this embodiment, removable connecting device 156 takes the form of a removable threaded ring that threads into splined adapter 152 in a manner that compresses chain ring support 154 against splined adapter 152. This threaded ring holds the spline shape of the chain ring engaged with the splined adapter and prevents unwanted movement of the chain ring in a direction parallel to the spindle rotational axis. However, with the threaded ring removed, the chain ring is free to be removed when pulled in a direction parallel with the crank assembly rotational axis. This allows the removal of the chain ring without requiring the removal of either of the crank arms of the crank assembly.

In the embodiment shown, the crank assembly is a mountain bike crank assembly that includes mounting points for three front sprockets. As will be described in more detail immediately hereinafter, the quick change chain ring arrangement illustrated allows the outer and middle chain rings or sprockets to be removed without removing the crank arm in literally a matter of seconds. This enables the rider to quickly change the gearing of their bicycle through different sized front chain rings, and encourages the rider to properly clean the main chain rings to increase life and increase performance through a properly cleaned and lubricated chain rings.

Still referring to FIGS. 1-3, a chain ring alignment system 160 designed in accordance with the invention will now be described. Chain ring alignment system 160 includes a chain ring adapter, such as chain ring adapter 152 described above, for supporting a chain ring. Chain ring adapter 152 is mounted to crank assembly 100 for rotation with the crank assembly about spindle rotational axis 106. However, chain ring adapter 152 is axially movable along spindle rotational axis 106 between a retracted position and an extended position. A driving mechanism 162 is connected to crank arm 115 for rotationally driving chain ring adapter 152 about spindle rotational axis 106 while allowing the chain ring adapter to move axially from the retracted position in which chain ring adapter 152 is furthest from crank arm 115 to the extended position in which chain ring adapter 152 is closest to crank arm 152. An adjusting device 164 is provided for moving chain ring adapter 152 axially along spindle rotational axis 106 between the retracted position and the extended position, independently from crank arm 115. This enables the proper alignment of chain ring adapter 152 relative to other components on the bicycle without requiring the axial movement of the crank arms and without requiring the crank arms to be positioned off center with reference to the bicycle frame.

In the embodiment illustrated in FIGS. 1-3, chain ring adapter 152 includes a threaded portion having a longitudinal axis about spindle rotational axis 106. In the embodiment shown, the threaded portion is actually provided as a separate threaded ring 167 that is press fit into chain ring adapter 152. Chain ring adapter 152 also includes two driving holes 166 having a longitudinal axis parallel spindle rotational axis 106. Driving mechanism 162 includes two driving bosses 168 that protrude out from crank arm 115. The bosses have a longitudinal axis that extends parallel to the crank assembly rotational axis. Bosses 168 are configured to engage driving holes 166 in chain ring adapter 152 in order to be capable of rotationally driving chain ring adapter 152 about spindle rotational axis 106 with the rotation of crank assembly 100. The bosses also allow axial movement of the chain ring adapter along the spindle rotational axis from the retracted position to the extended position. Adjusting device 164 takes the form of a threaded adjustment dial 170 and a retaining flange piece 172. Threaded adjusting dial 170 has threads that match the threaded portion 166 of chain ring adapter 152. Threaded adjustment dial 170 is configured to move chain ring adapter 152 between the retracted position to the extended position as indicated by arrow 174 in FIG. 2 when threaded adjustment dial 170 is turned into and out of the matching threads of chain ring adapter 152. Retainer flange piece 172 is press fit onto spindle portion 114 such that threaded adjustment dial 170 is prevented from separating from threaded ring 167 of chain ring adapter 152 when the chain ring alignment system is attached to the crank assembly.

The above described chain ring alignment system allows a rider to adjust their chain rings without a tool. This uniquely allows the chain ring to move independently of the crank arm and spindle, thus enabling the crank arms and spindle to remain perfectly centered in reference to the center of the bicycle frame. Aside from adjusting the linear position of the chain rings, the chain ring alignment system also provides a unique connection between the chain rings and the driving crank arm. Unlike all conventional crank systems, the chain rings of the chain ring alignment system of the present invention are not bolted directly or clamped to the driving crank arm. Instead, the chain ring is driven by bosses 168. This allows the alignment of the chain rings to stay perpendicular to the spindle rotational axis, and remain virtually unaffected by any crank arm flex that can oscillate the chain rings.

Figure 8:
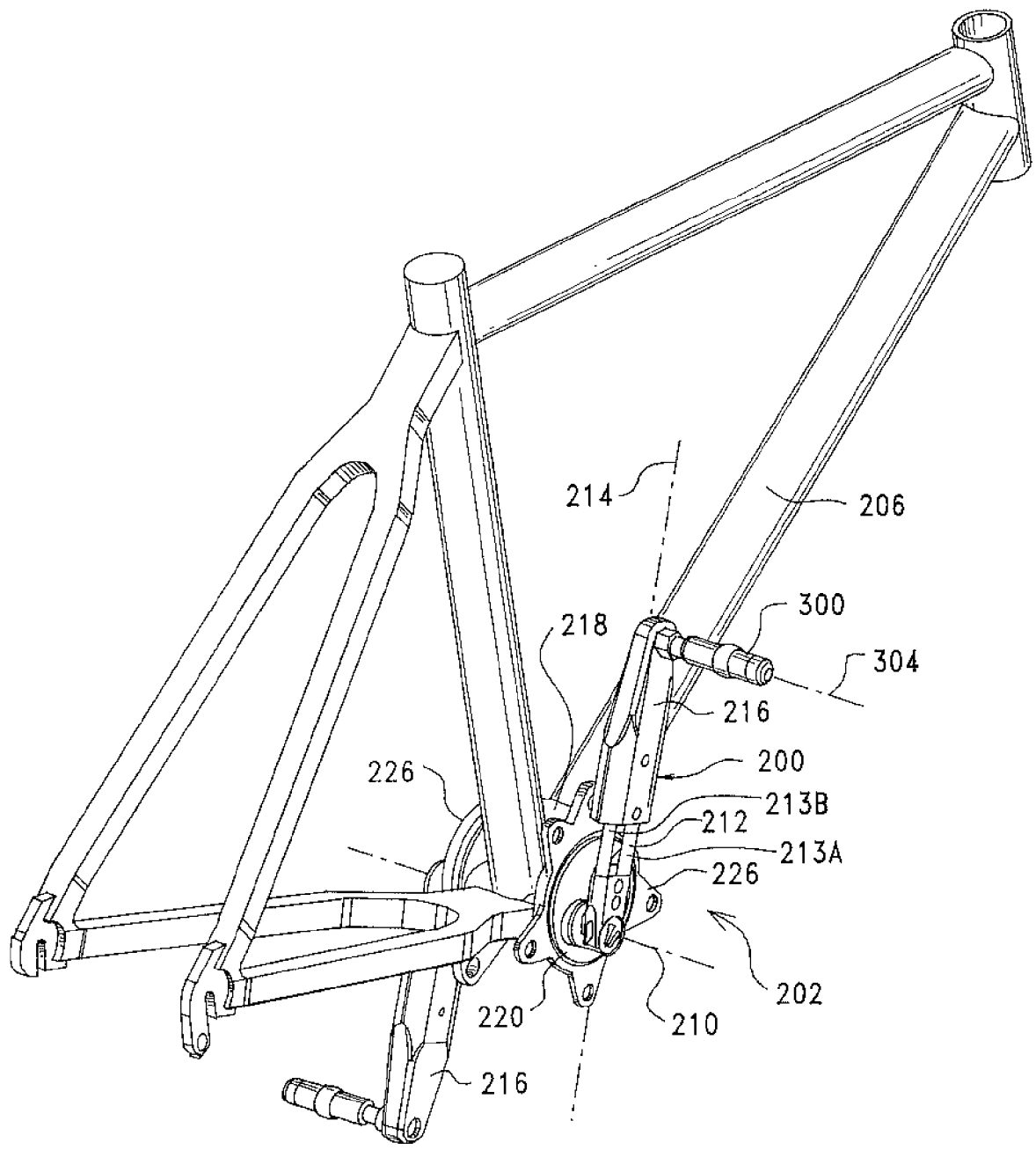
FIG. 8 is a perspective view of one embodiment of a variable length crank arm arrangement designed in accordance with the invention.
Figure 9:
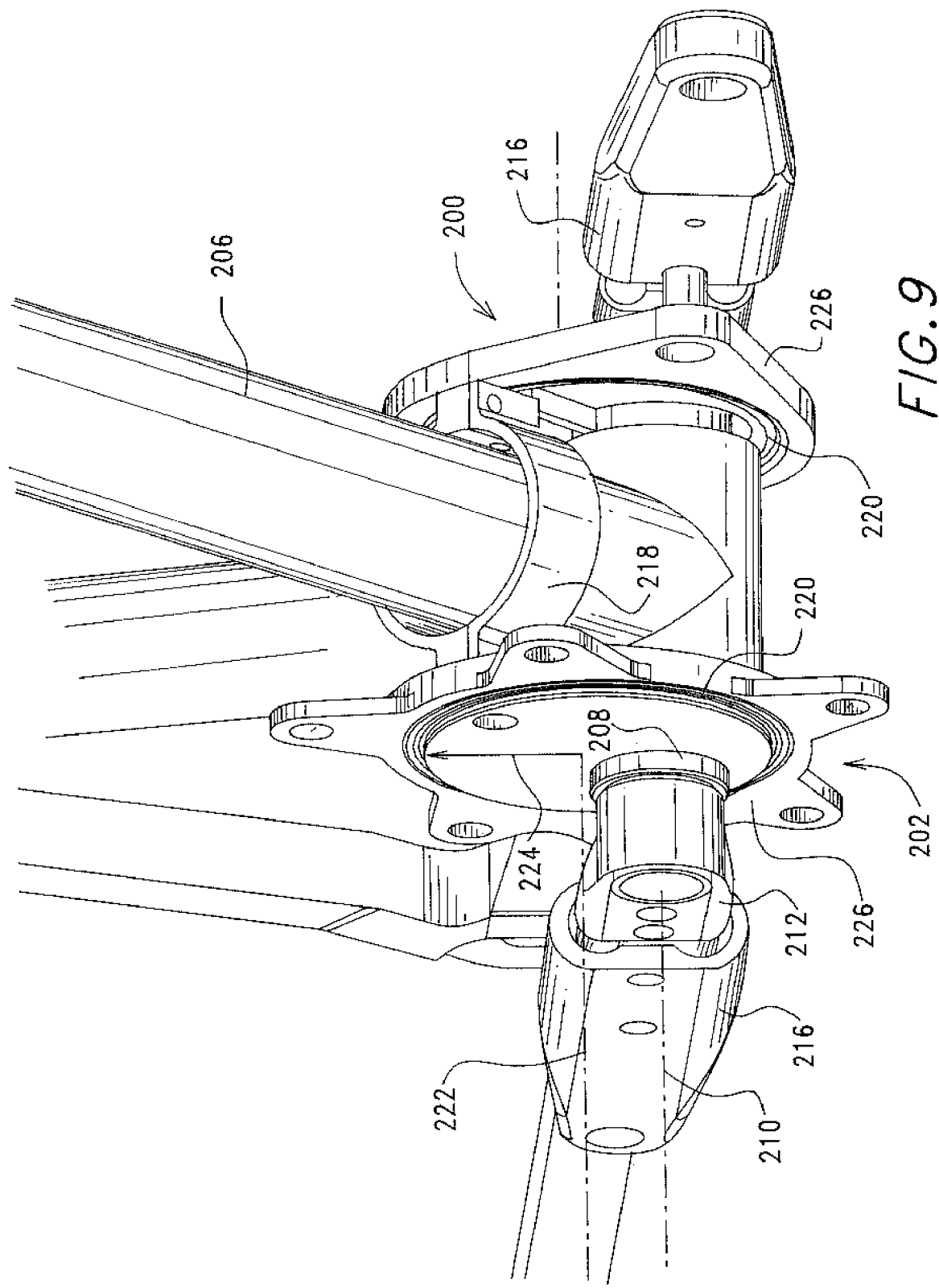
FIG. 9 is a second perspective view from a different angle of the variable length crank arm arrangement of FIG. 8.
Figure 10:
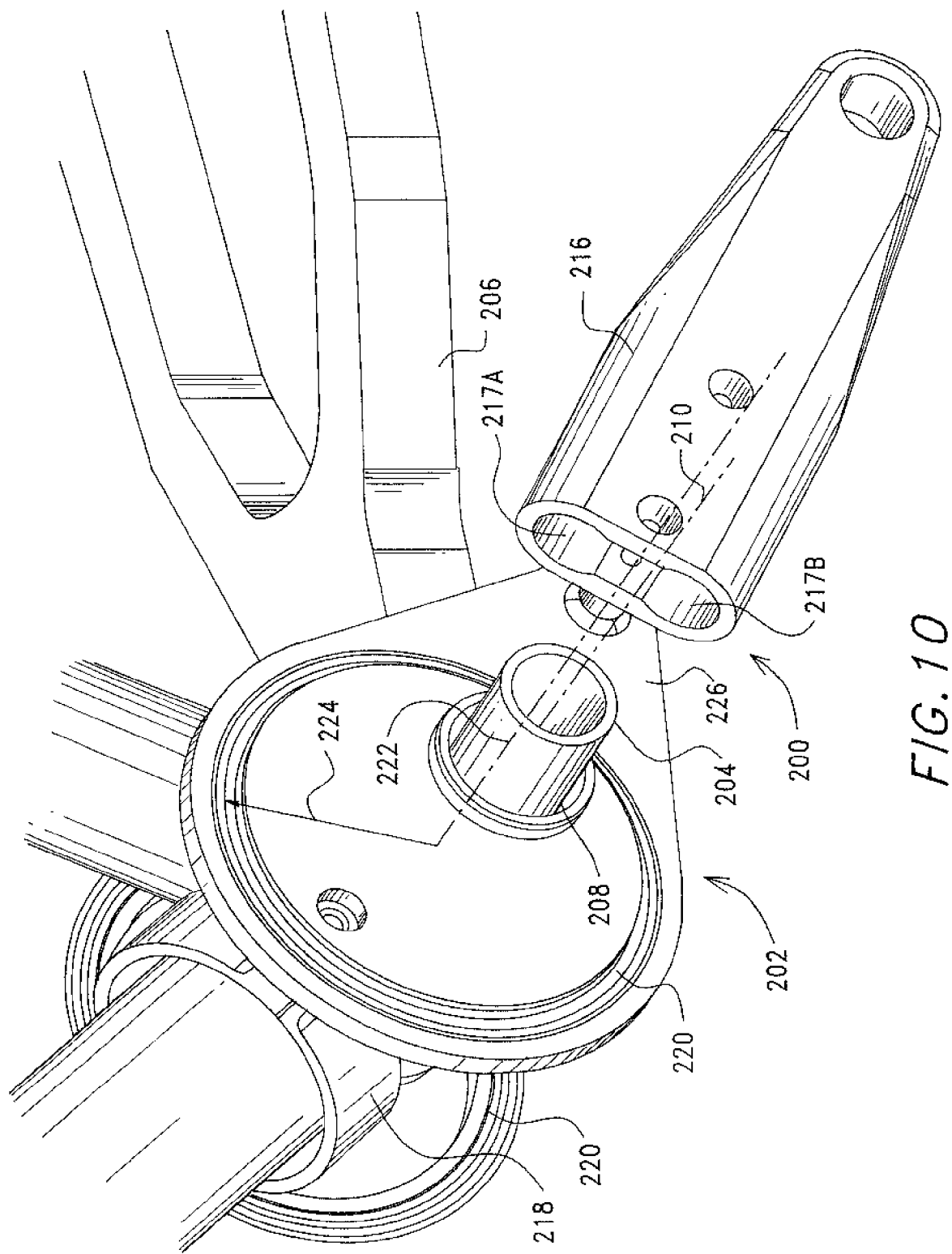
FIG. 10 is a third perspective view of a portion of the variable length crank arm arrangement of FIG. 8.

Referring now to FIGS. 8-10, a variable length crank arm arrangement 200 designed in accordance with the invention and for use on a bicycle crank arm assembly 202 is also disclosed. Variable length crank arm arrangement 200 includes a spindle 204 for attaching the crank assembly to a bicycle frame 206. Spindle 204 has a spindle bearing surface 208, shown best in FIG. 10, for mounting spindle 204 to the bicycle such that the spindle is free to rotate about a spindle rotational axis 210. A fixed crank arm 212 (not shown in FIG. 10), having a longitudinal axis 214 (shown in FIG. 8) extending substantially perpendicular to spindle rotational axis 210, is fixed to spindle 204 for rotation with spindle 204 about spindle rotational axis 210. A floating crank arm 216, having a longitudinal axis that coincides with longitudinal axis 214 of fixed crank arm 212, is slidably connected to fixed crank arm 212 to allow floating crank arm 216 to move in a linear motion along longitudinal axis 214 of fixed crank arm 212 while maintaining a common longitudinal axis with fixed crank arm 212. A control bracket 218 (shown best in FIG. 9) is fixed to bicycle frame 206. Control bracket 218 may be a separate piece that is attached to a conventional bicycle frame as illustrated in FIG. 9, or alternatively, the control bracket may be provided as an integral part of the of the bicycle frame as illustrated in FIG. 8.

Referring now to FIGS. 9 and 10, control bracket 218 includes a rotational control bearing surface 220 that defines a control rotational axis 222 that is parallel with, but spaced apart from, spindle rotational axis 210. Control bearing surface 220 has a control bearing radius 224 with control bearing surface 220 being positioned such that spindle rotational axis 210 falls within control bearing radius 224 when viewed in a plane perpendicular to spindle rotational axis 210. A control arm 226 is attached to control bracket 218 for rotation about control axis 222 along control bearing surface 220. Control arm 226 is rotatably attached to floating crank arm 216 such that the longitudinal axis of the floating crank arm is able to remain perpendicular to spindle rotational axis 210.

With the variable length crank arm arrangement configuration described above, floating crank arm 216 causes control arm 226 to rotate about control rotational axis 222 and causes fixed crank arm 212 to rotate about spindle rotational axis 210 as floating crank arm 216 is rotated about control rotational axis 222 by a rider. This causes floating crank arm 216 to move back and forth along longitudinal axis 214 of fixed crank arm 212 relative to spindle rotational axis 210. Due to the spacing between spindle rotational axis 210 and control rotational axis 222, floating crank arm 216 pivots slightly back and forth relative to control arm 226 as the variable length crank arm arrangement is rotated by the rider. The overall length of the combination of the fixed crank arm and the floating crank arm varies along their common longitudinal axis by a distance equal to twice the spacing between the control rotational axis and the spindle rotational axis.

In the embodiment shown in FIGS. 8-10, fixed crank arm 212 includes two rods 213A and 213B that are designed to slidably mate with or engage two openings 217A and 217B formed into floating crank arm 216. Openings 217A and 217B have bearings, bushings, or some other readily providable arrangement fit into the openings for receiving rods 213A and 213B such that the rods may easily slide within openings 217A and 217b while transferring any crank arm loads or forces between floating crank arm 216 and fixed crank arm 212. This two-rod configuration provides two spaced apart connection points between floating crank arm 216 and fixed crank arm 212. These spaced apart connection points stabilize the connection between floating crank arm 216 and fixed crank arm 212. This configuration may also allow lighter weight components to be used for the slidable connection arrangement than would otherwise be possible using an arrangement that utilized, for example, a fixed crank arm having only a single rod slidably engaging a single opening on the floating crank arm. Although the embodiment shown utilizes two rods as the means for slidably connecting fixed crank arm 212 and floating crank arm 216, it should be understood that other slidable connection arrangements may be utilized so long as floating crank arm 216 is able to slidably move relative to fixed crank arm 212 as described herein.

In one embodiment of the variable length crank arm, control rotational axis 222 is spaced apart from spindle rotational axis 210 by a distance in the range of about ½" to ⅞". In this embodiment, control rotational axis 222 is located above and toward the front of the bike relative to spindle rotational axis 210. This causes the overall length of the combination of fixed crank arm 212 and floating crank arm 216 to be greatest during the downward stroke of the crank arm arrangement as the bicycle is being ridden. This also causes the overall length of the combination of fixed crank arm 212 and floating crank arm 216 to be least during the upward stroke of the crank arm arrangement. Therefore, this configuration provides most of the leverage benefits of a longer crank arm with no added circumference. This leverage advantage may be increased by increasing the spacing between the control rotational axis and the spindle rotational axis.

Besides the increase in power, this variable length crank arm arrangement, may be configured to increase the ground clearance of the crank assembly. This is accomplished by locating the control rotational axis above the spindle rotational axis. An added benefit of the increased ground clearance is that this system allows for more suspension travel on a suspension bicycle where often times more suspension travel is desired, yet the ground clearance of the pedals is the limiting factor.

One of the unique features of the variable length crank arm arrangement of the invention lies in the fact that it utilizes a multiple bearing housing with eccentric bearing axis. This is a simple configuration that can either be adapted to current bicycle frames as shown in FIG. 9 or incorporated into the frame or sub-frame of bicycles in the future as illustrated in FIG. 8. This configuration also provides a very durable and stable configuration due to the positioning of the spindle rotational axis within the radius of the larger control arm bearing surface and due to the relatively few pieces required to provide the arrangement.

Figure 11A:
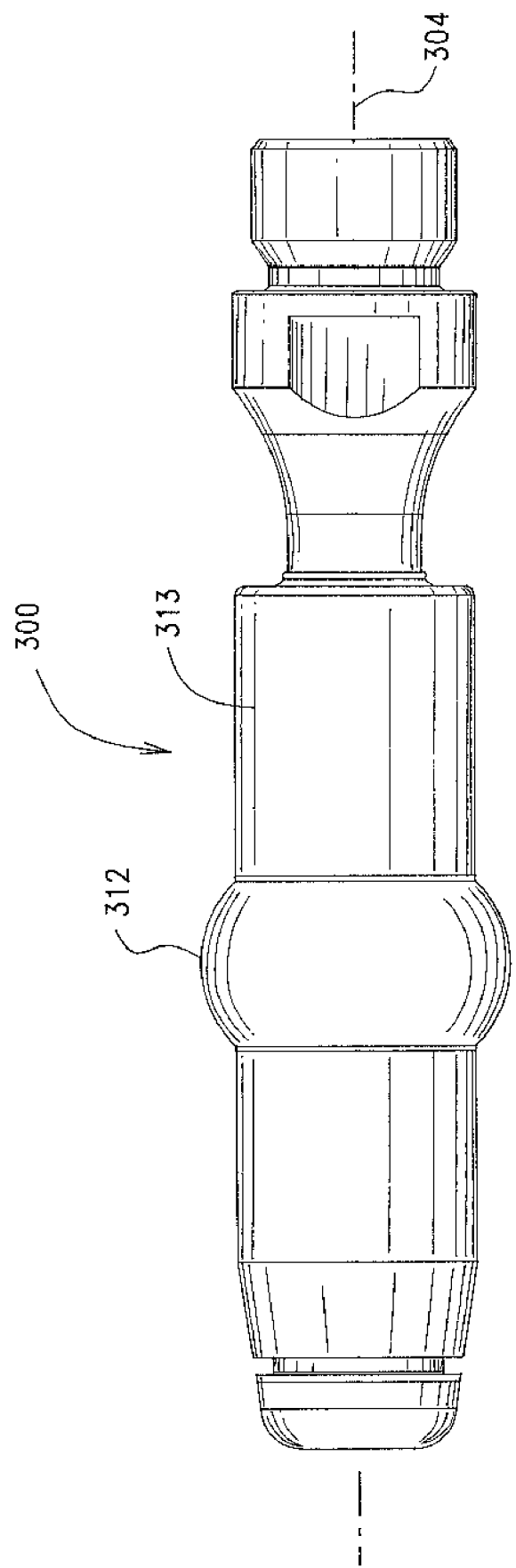
FIG. 11A is a plan view of a pedal designed in accordance with the invention.
Figure 11B:
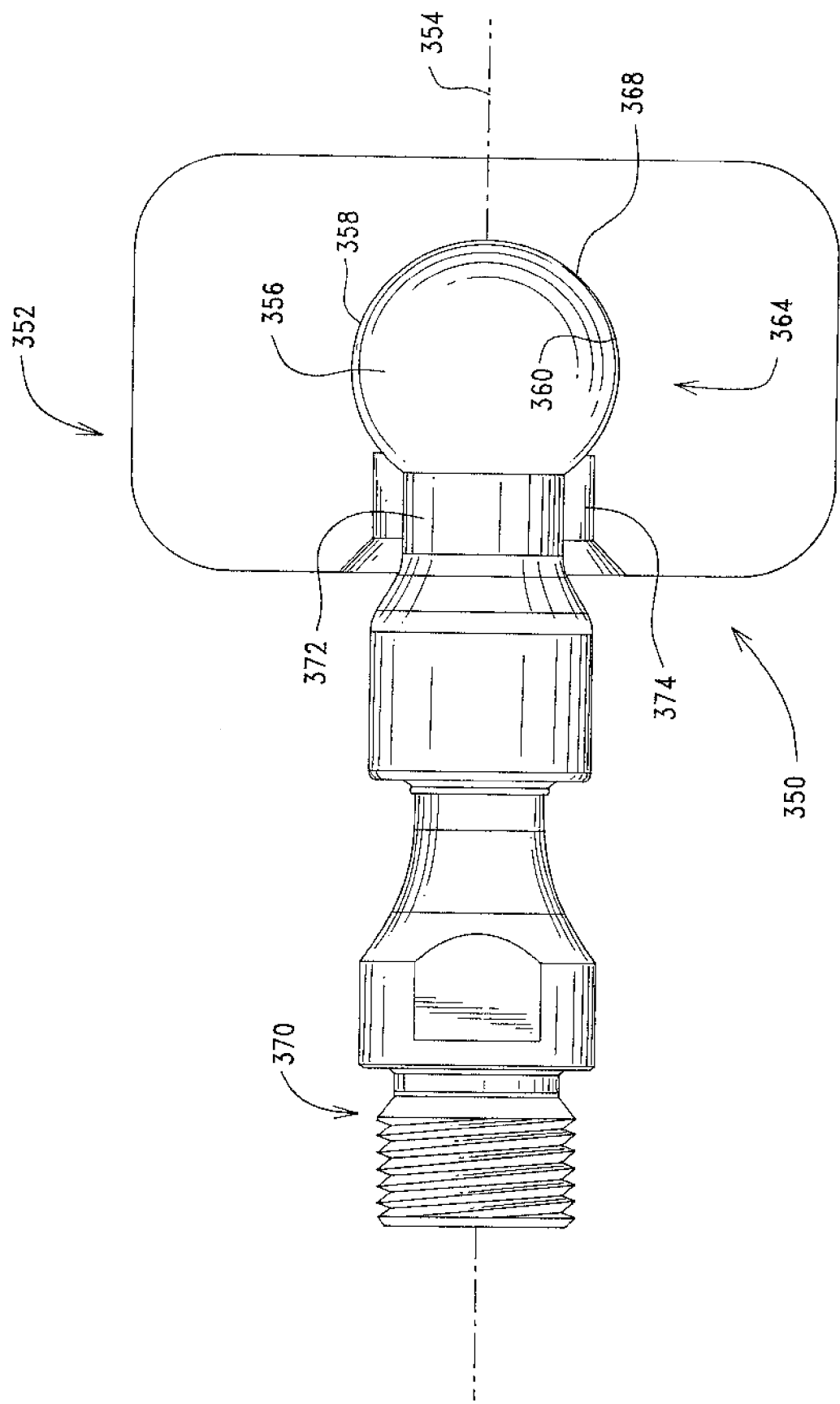
FIG. 11B is a plan view of a second pedal and an associated pedal gripping arrangement designed in accordance with the invention.
Figure 11C:
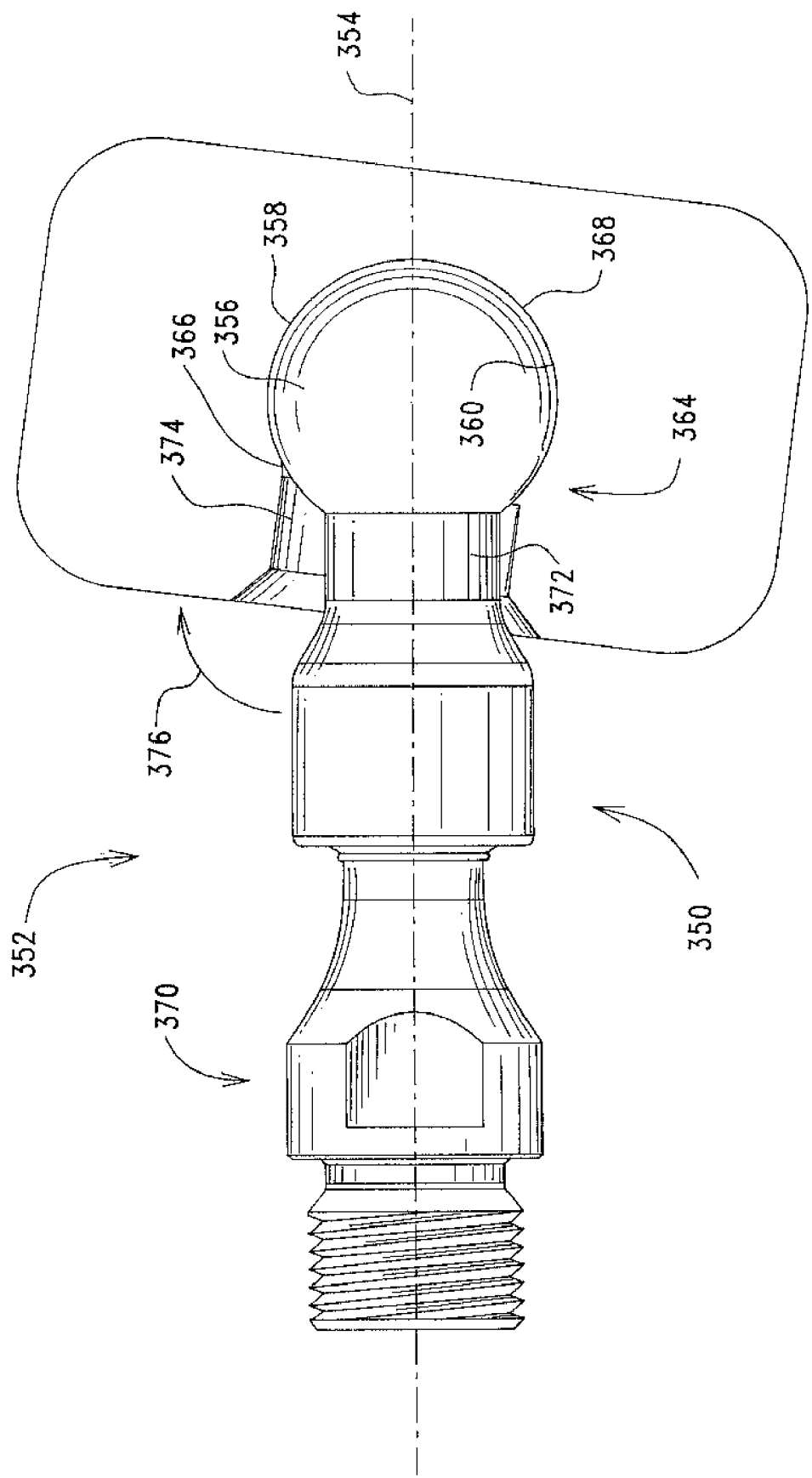
FIG. 11C is a plan view of the pedal and gripping arrangement of FIG. 11B illustrating the ability of the gripping arrangement to swivel about the pedal.
Figure 12A:
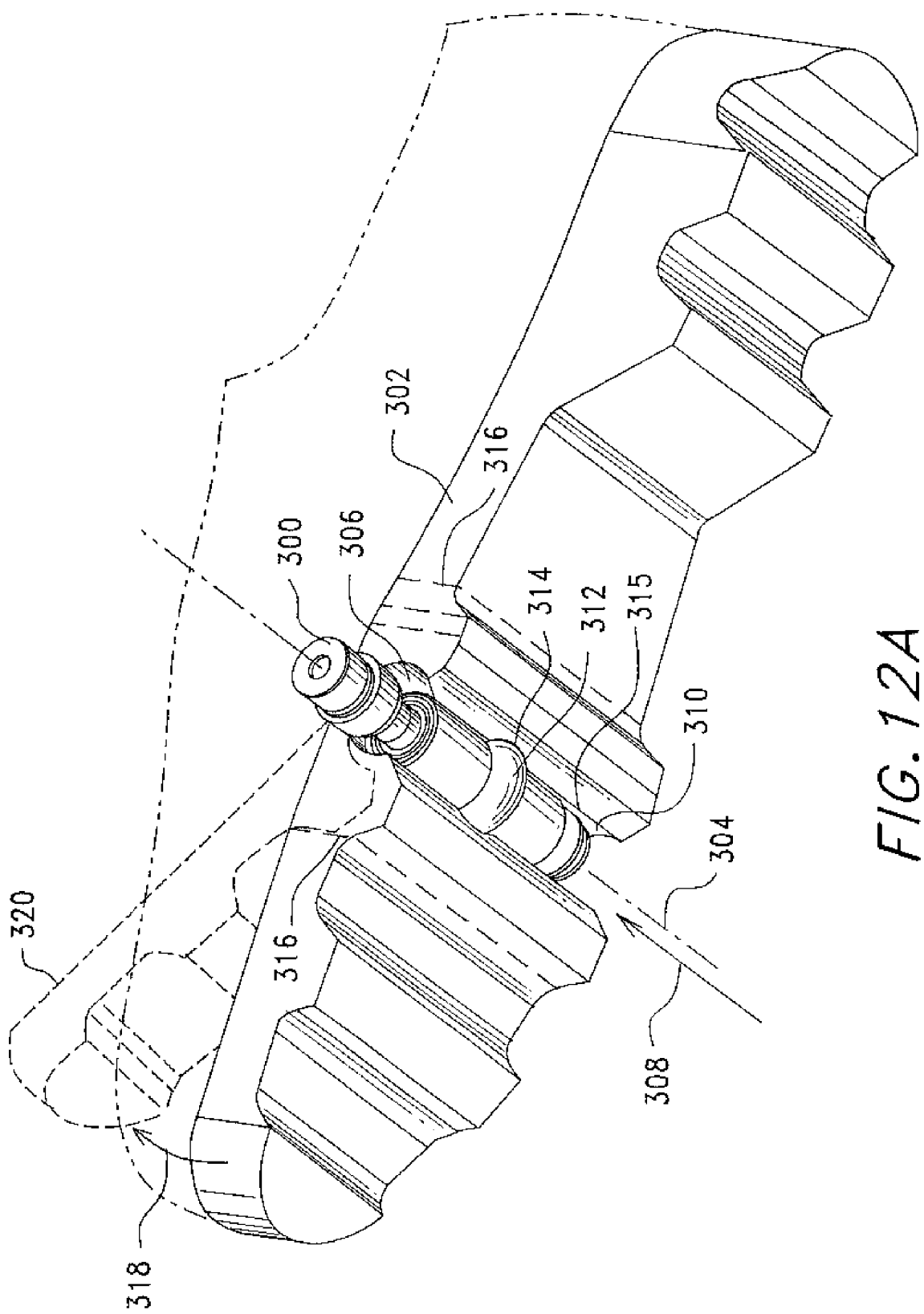
FIG. 12A is a perspective view of a bicycle shoe designed in accordance with the invention.

Referring now to FIGS. 8, 11A-C, and 12A-C, a pedal connection arrangement designed in accordance with the invention will be described. FIG. 8 illustrates a pedal 300 attached to the variable crank arm arrangement described above. FIG. 11A is a plan view of pedal 300. And, FIG. 12A illustrates a bicycle shoe 302 designed in accordance with the invention that is configured to attach to pedal 300.

As illustrated by FIG. 12A, the pedal connection arrangement of the invention is designed to hold a bicycle shoe attached to a bicycle pedal. As is the case for conventional bicycles, pedal 300 is used to drive a bicycle crank arm having a crank arm longitudinal axis. Pedal 300 has a pedal longitudinal axis 304. The pedal is connected to a crank arm, such as variable length crank arm arrangement 200 of FIG. 8, with pedal longitudinal axis 304 substantially perpendicular to the crank arm longitudinal axis 214. The pedal connection arrangement also includes bicycle shoe 302 having a gripping arrangement 306 attached to the shoe. Gripping arrangement 306 has a longitudinal axis, also indicated by reference numeral 304 in FIG. 12A. Longitudinal axis 304 runs generally along the ball of the shoe in a plane parallel to the sole of the shoe and perpendicular to a line extending from the toe of the shoe through the heel of the shoe. Gripping arrangement 306 is configured such that the gripping arrangement grips pedal 300 when gripping arrangement 306 is engaged with pedal 300 with the longitudinal axis of the gripping arrangement coinciding with the longitudinal axis of the pedal. This may be accomplished by pressing the gripping arrangement over the top of the pedal, or, alternatively, by positioning the gripping arrangement on the shoe adjacent to pedal 300 with longitudinal axis 304 of gripping arrangement 306 aligned with longitudinal axis 304 of pedal 300 and then moved along the common longitudinal axes 304 of gripping arrangement 306 and pedal 300 to engage pedal 300 as indicated by arrow 308.

In the embodiment of the pedal connection arrangement shown in FIGS. 11A and 12A, pedal 300 has a radially symmetrical cross sectional shape along pedal longitudinal axis 304 and gripping arrangement 306 has a mating radially symmetrical cavity 310. This configuration allows gripping arrangement 306 to be connected to pedal 300 with pedal 300 without regard for the rotational position of the pedal about the pedal longitudinal axis. Pedal 300 may have a shape made up of a combination of a cylindrical shape and a spherical shape. As mentioned above, gripping arrangement 306 has a similarly mating cavity. In the specific embodiment shown in FIGS. 11A and 12A, the pedal has a central spherical shape 312 intersected by a cylindrical shape 313 that extends entirely through spherical portion 312. Gripping arrangement 306 has a mating spherical cavity 314 intersected by a cylindrical cavity 315. In this embodiment, spherical cavity 314 is designed to securely grip spherical portion 312 of pedal 300. However, in accordance with the invention, cylindrical cavity 315 of gripping arrangement 306 may be made a predetermined amount larger than the cylindrical shape 313 of the pedal. This configuration allows the pedal to be securely connected to the shoe via spherical portion 312 of pedal 300 and mating spherical cavity 314 of gripping arrangement 306. However, since cylindrical cavity 315 is larger than cylindrical portion 313 of pedal 300, pedal gripping arrangement 306 remains free to swivel to a predetermined degree about spherical portion 312 of pedal 300. this freedom of movement gives more flexibility for maneuverability to the rider while maintaining positive contact between the shoe and the pedal.

Gripping arrangement 306 may be an independently formed gripping device that is attached to a separate bicycle shoe as indicted by dashed line 316 in FIG. 12A. Alternatively, the gripping arrangement may be formed as part of bicycle shoe 302 as described above. Gripping arrangement 306 may also be made from a pliable material that allows the rider to engage the shoe with and release the shoe from the pedal by bending the toe of the shoe up out of a natural relaxed position as indicated by arrow 318 and dashed line 320 in FIG. 12A. This causes gripping arrangement 306 to flex. This flexing of the foot causes gripping arrangement 306 to expand on the bottom of the shoe and therefore causes the gripping arrangement to easily be engaged with or released from the pedal. An additional benefit to this pliable material is that the rider may also "grip" the pedal more tightly by flexing the toe of the shoe downward. This downward flexing causes gripping arrangement 306 to more tightly grip pedal 300.

Another embodiment of a pedal connection arrangement designed in accordance with the invention is illustrated in FIGS. 11B-C and 12B-C. In this embodiment, a pedal connection arrangement 350 includes a pedal 352 having a pedal longitudinal axis 354 around which the pedal is intended to rotate. The pedal includes a spherical portion 356 having an outer spherical surface 358 and an engaging surface 360. Engaging surface 360 includes at least portions of outer spherical surface 358 of spherical portion 356 of pedal 352, and, spherical portion 356 of pedal 352 is located along pedal longitudinal axis 354 such that pedal 352 has a radially symmetrical cross sectional shape along the pedal longitudinal axis.

Figure 12B:
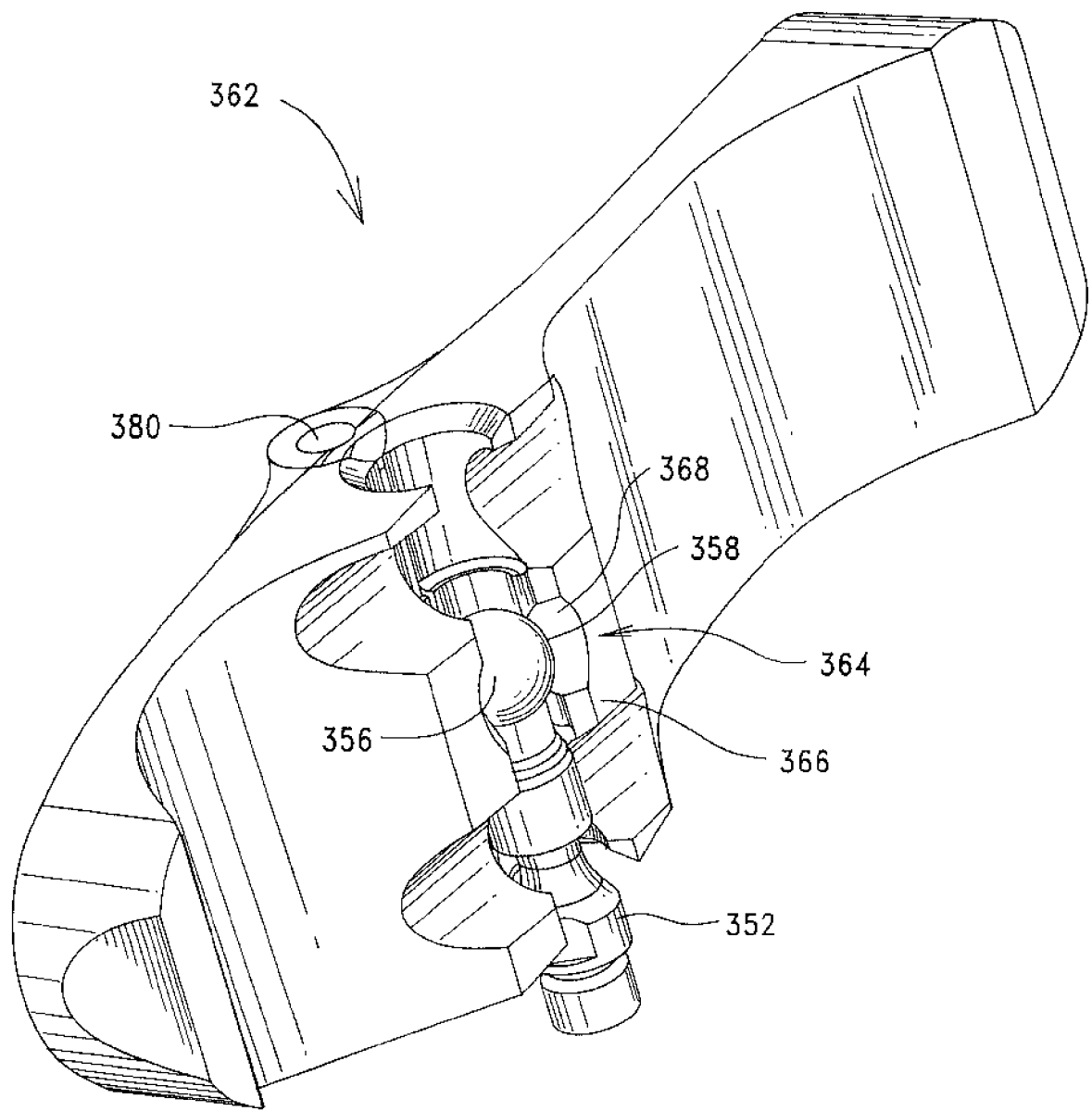
FIG. 12 B is a perspective view of a second bicycle shoe designed in accordance with the invention.

Pedal connection arrangement 350 also includes a bicycle shoe 362 having a pedal gripping arrangement 364 as best shown inn FIG. 12B. Pedal gripping arrangement 364 includes a pedal gripping cavity 366. Pedal gripping cavity 366 has a spherical cavity portion 368 that has a shape that is defined by at least a portion of a sphere such that spherical cavity portion 368 of pedal gripping cavity 366 directly engages at least portions of outer spherical surface 358 of spherical portion 356 of pedal 352 when pedal gripping arrangement 364 is engaged with spherical portion 356 of pedal 352. This configuration allows pedal gripping arrangement 364 to securely grip at least portions of engaging surface 360 of spherical portion 356 of pedal 352 when spherical portion 356 is engaged with spherical cavity portion 368 of gripping arrangement 364. This configuration also allows the pedal gripping arrangement to be engaged with the spherical portion of the pedal regardless of the rotational position of the pedal about the pedal longitudinal axis.

In the embodiment of the pedal connection arrangement illustrated in FIGS. 11B-C and 12B-C, pedal 352 further includes an attaching arrangement 370 for attaching pedal 352 to a bicycle crank arm. Pedal 352 also includes a cylindrical portion 372 that is designed to cooperate with pedal gripping arrangement 364 to provide an arrangement for limiting the degree to which pedal gripping arrangement 364 is able to swivel about an axis that is perpendicular to pedal longitudinal axis 354. As best shown in FIG. 11C, pedal gripping cavity 366 includes a cylindrically shaped cavity portion 374 that is larger than cylindrical portion 372 of pedal 352. This allows pedal gripping arrangement 364 to securely grip at least portions of engaging surface 360 of spherical portion 356 of pedal 352, yet remain free to swivel in various directions about spherical portion 356 of pedal 352 to at least a predetermined degree as indicated by arrow 376 in FIG. 11C when pedal gripping arrangement 364 is engaged with pedal 352. As indicated by arrow 376, the various directions that pedal gripping arrangement 364 is able to swivel about spherical portion 356 of pedal 352 includes the direction that is perpendicular to pedal longitudinal axis 354. That is, pedal gripping arrangement 364 is able to swivel in directions other than about the pedal longitudinal axis. This gives more flexibility for movement of the rider's foot while maintaining positive contact between the pedal gripping arrangement and the spherical portion of the pedal. As would be understood by one skilled in the art, the degree to which the pedal gripping arrangement of this embodiment may swivel may be controlled by controlling the size of cylindrical shaped cavity portion 374 of pedal gripping cavity 366 compared to the size of cylindrical portion 372 of pedal 352.

As mentioned above for the embodiment illustrated in FIG. 12A, the pedal gripping arrangement may be an independently formed gripping device that is attached to the bicycle shoe. Alternatively, the pedal gripping arrangement may be formed as part of the bicycle shoe. Also, the pedal gripping arrangement may be made from a pliable material that allows a rider to release the shoe from the pedal by bending their toes up out of a natural relaxed position causing the pedal gripping arrangement to flex thereby expanding the pedal gripping arrangement and causing the pedal gripping arrangement to release the pedal. Using a pliable material also allows the rider to more tightly grip the pedal by bending their toes down out of a natural relaxed position causing the pedal gripping arrangement to flex thereby compressing the pedal gripping arrangement and causing the pedal gripping arrangement to more tightly grip the pedal.

Figure 12C:
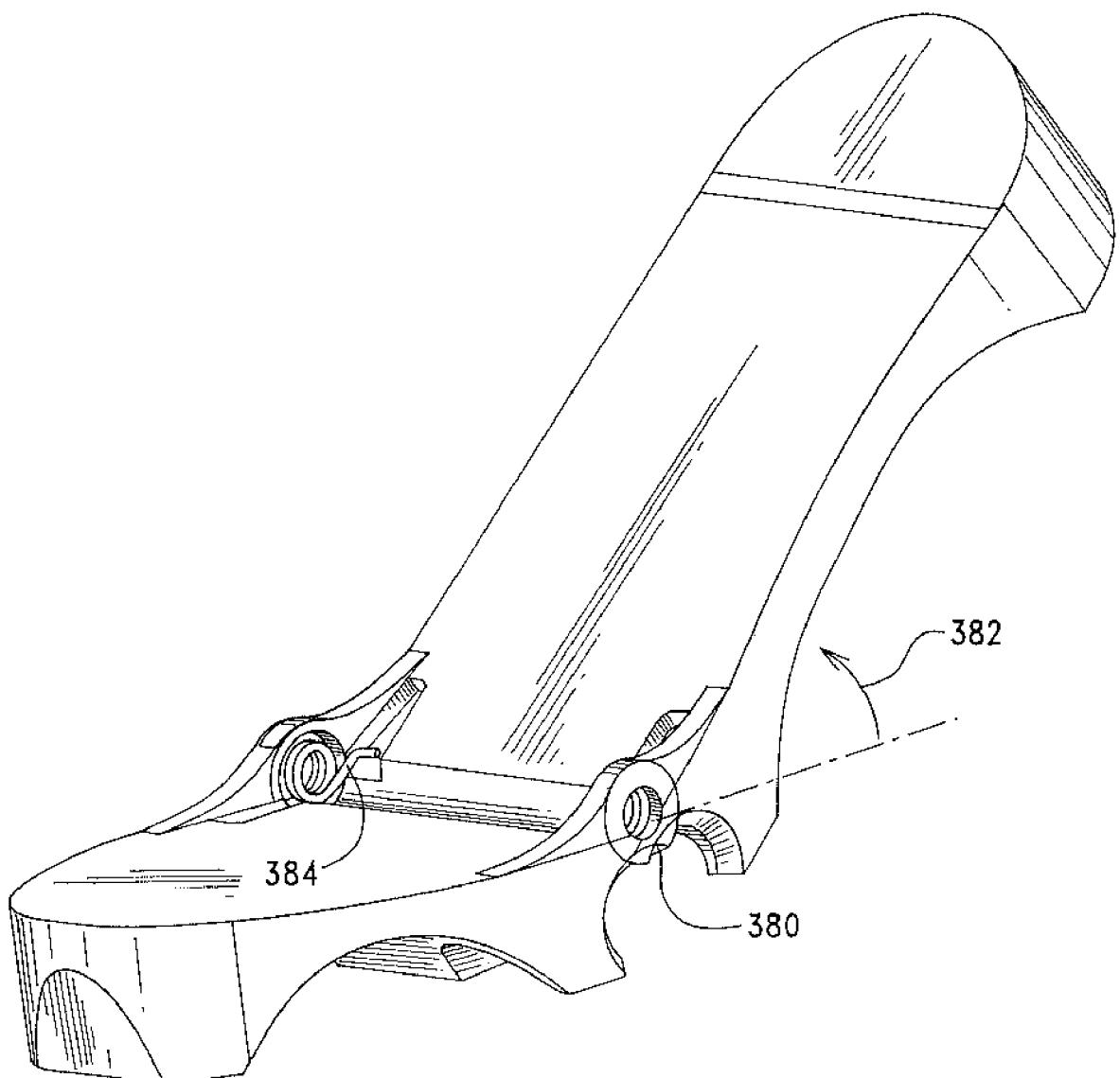

Alternatively, as illustrated in FIGS. 12B and 12C, pedal gripping arrangement 364 may include a hinge 380 located adjacent to pedal gripping arrangement 364. This configuration allows a rider to release the shoe from the pedal, or disengage the pedal gripping arrangement, by bending their toes up out of a natural relaxed position causing the pedal gripping arrangement to expand and release the pedal as illustrated by arrow 382 in FIG. 12C. As also illustrated best in FIG. 12C, the shoe may further include a biasing arrangement 384 for biasing the pedal gripping arrangement into a position that grips the pedal when the riders foot is in a natural relaxed position. In the embodiment shown, biasing arrangement 384 takes the form of a pair of coil springs mounted in the sole of the shoe along hinge 380. An additional potential benefit to this biasing arrangement configuration is that, when the rider is off the bike and hiking or climbing, the biasing arrangement may return some of the energy derived from absorbing the riders weight to the rider since the return spring force would assist the rider in lifting their legs.

Referring again to FIGS. 1-3, a bearing housing arrangement for use on a bicycle crank assembly, designed in accordance with the invention, will now be described. In the embodiment shown, crank assembly 100 includes two bearing housing arrangements 400 and 402. Bearing housing arrangements 400 and 402 respectively include threaded housing portions 404 and 406 that have external threads 408 and 410 for threading threaded housing portions 404 and 406 into mating threads provided in a conventional bottom bracket of a bicycle frame. These threaded portions 404 and 406 provide an arrangement for connecting crank assembly 100 to the bicycle frame.

In the embodiment shown, bearing housing arrangements 400 and 402 are configured to house needle bearings, (not shown in the figures). Therefore, threaded housing portions 404 and 406 also include needle bearing surfaces as indicated by surface 412 of threaded housing portion 404. Bearing housing arrangements 400 and 402 also include removable needle bearing races 414 and 416. These removable bearing races 414 and 416 are pressed onto associated spindle portions 108 and 114.

As illustrated best in FIGS. 2 and 3, bearing housing arrangement 400 also includes a thrust bearing 418, a thrust bearing spacer 420, a thrust bearing seal 422, and a threaded bearing housing retaining ring 424. Thrust bearing housing retaining ring 424 threads onto threaded bearing housing portion 404 to retain the outside diameter, or fixed portion, of thrust bearing 418 in its proper position. This axially locates thrust bearing 418 in its proper location in reference to the bicycle frame. The proper positioning of the rotating portion of crank assembly 100 is then achieved as one side of the inside diameter, or rotating portion, of thrust bearing 418 is positioned against spacer 420 which is positioned against a thrust bearing shoulder 426 on spindle portion 108.

Figure 14:
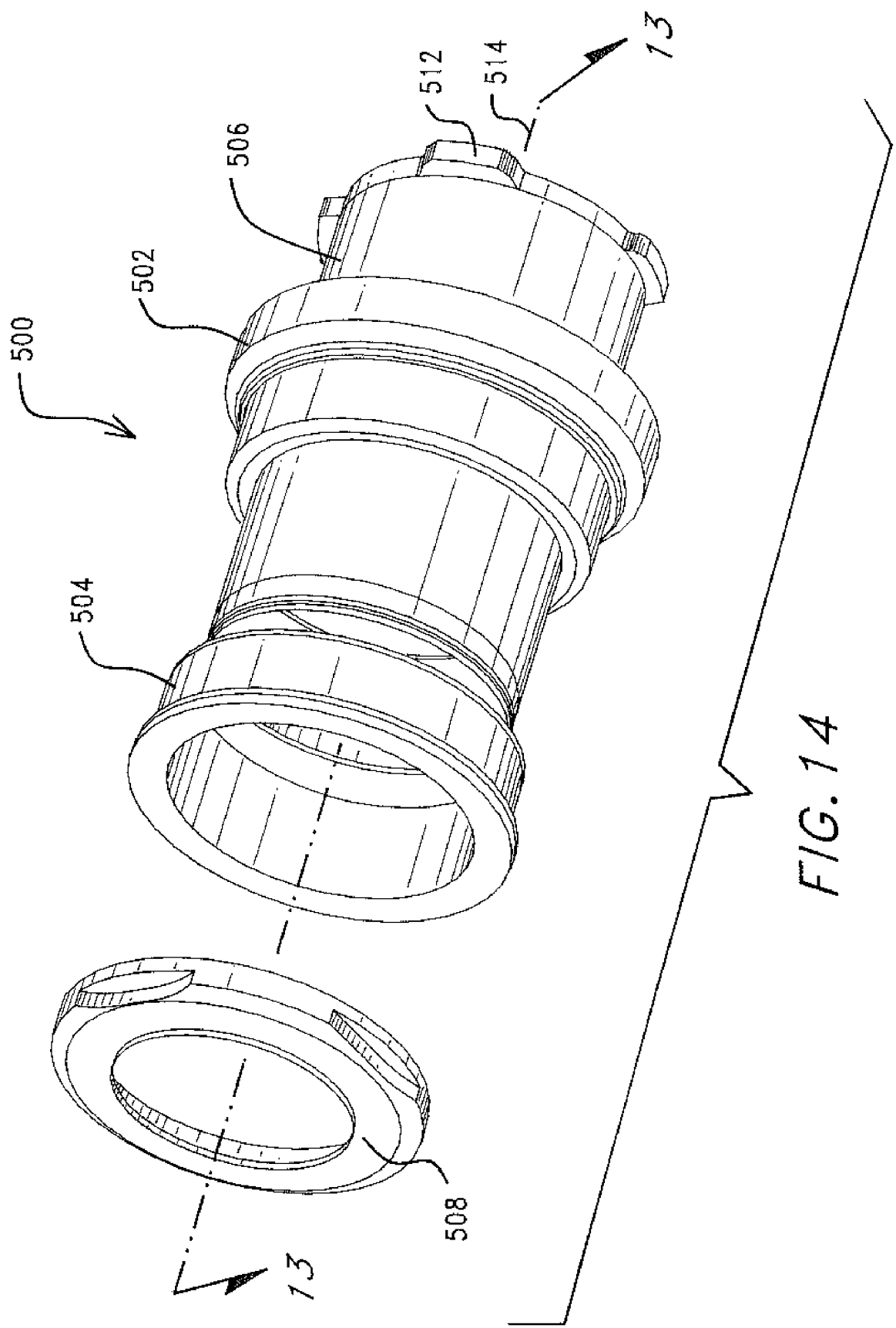
FIG. 14 is a partially exploded view of the splined bearing cartridge assembly of FIG. 13.

As illustrated in FIGS. 13 and 14, removable bearing race 414 includes a shoulder 430 and a flange 431. Also spindle portion 108 includes a shoulder 432 and spindle portion 114 includes a shoulder 434. The side opposite retaining ring 424 of the rotating portion of thrust bearing 418 is positioned against a flange 431 of removable bearing race 414. Shoulder 430 of removable bearing race 414 fixes removable bearing race 414 in its axial position along spindle rotational axis 106 in its proper position relative to spindle portions 108 and 114, as it is clamped between shoulder 432 of spindle portion 108 and shoulder 434 of spindle portion 114.

Spindle portion 108 further includes an additional shoulder 436. Seal 422 is then positioned between shoulder 436 of spindle portion 108 and bearing spacer 420 to prevent the entry of dirt and other contaminants into thrust bearing 418 or the needle bearings. This thrust bearing configuration prevents movement of the spindle arrangement axially along spindle rotational axis 106 when the spindle arrangement is connected to the bottom bracket of a bicycle frame.

The bearing housing arrangements described above allow for much easier removal and disassembly of the spindle bearings compared to conventional spindle bearing arrangements. This encourages proper maintenance of these components. Also, by providing bearing races 414 and 416 as separate press fit pieces rather than integral parts of spindle portions 108 and 114, these bearing races may be easily replaced without having to discard the spindle portions.

Most BMX bicycle frames use bearing cups that press fit into the bottom bracket shell of the bicycle frame as opposed to threading in to the bottom bracket as described above. This press fit bearing configuration is not very suitable for a conventional needle bearing because the housing of a typical needle bearing is relatively flimsy. Therefore, the distortion caused by the dramatic press fit (which can vary between different BMX frames) could place a distorted load on the needle bearing. This press fit configuration also discourages proper care and or replacing of the needle bearings since they would be fairly difficult to remove once installed. To overcome this problem, the present invention provides a splined bearing cartridge assembly that isolates the press fit portion of the bearing arrangement from the bearings. As will be described in more detail hereinafter, this is accomplished by placing the bearings in a removable cartridge.

Referring now to FIGS. 13 and 14, a splined bearing cartridge system 500, designed in accordance with the invention, will be described. In the embodiment shown, splined bearing cartridge 500 includes two bearing rings 502 and 504 that are designed to be press fit into a bottom bracket of a bicycle frame such as a BMX bicycle frame. Splined cartridge system 500 also includes a bearing cartridge 506 and a lock ring 508. In this embodiment, bearing ring 502 has a spline shape 510 formed into an interior portion of bearing ring 502. Bearing cartridge 506 has a mating spine shape 512 that is designed to mate with spline shape 510 of bearing ring 502.

As illustrated in FIGS. 13 and 14, splined shape 512 of bearing cartridge 506 is mated with spline shape 510 of bearing ring 502 such that bearing cartridge 506 extends longitudinally along a spindle rotational axis 514 when assembly 500 inserted within a bottom bracket of a bicycle frame. The press fit of bearing ring 502 and the spline shapes of bearing cartridge 506 and bearing ring 502 prevent the cartridge from rotating independently of the bottom bracket of the bicycle frame.

In the embodiment being described, bearing cartridge 506 has a threaded portion 516 at the end opposite spline shape 512. Lock ring 508 is configured to thread onto threaded portion 516 of bearing cartridge 506 so that it retains spline shape 512 of bearing cartridge 506 engaged with spline shape 510 of bearing ring 502. This cartridge arrangement allows for easy removal of the bearings from the bottom bracket for maintenance and inspection purposes. This cartridge arrangement also acts as a convenient sealing system that prevents water or other unwanted elements from entering into the needle bearings.

Although bearing rings 502 and 504 have been described as being designed to be press fit into the bottom bracket of a bicycle frame, this is not a requirement. Instead, in situations in which the bottom bracket is threaded, bearing rings 502 and 504 would include an externally threaded portion for mating with the threaded portions of the bottom bracket.

Although the above described embodiments have been described with the various components having particular respective orientations, it should be understood that the present invention may take on a wide variety of specific configurations with the various components being located in a wide variety of positions and mutual orientations and still remain within the scope of the present invention. The present invention would equally apply to these various configurations. Therefore, the present examples are to be considered as illustrative and not restrictive, and the invention is not to be limited to the details given herein, but may be modified within the scope of the appended claims.

What is claimed is:

1. A bicycle shoe for releasably attaching to a bicycle pedal to hold a bicycle rider's foot attached to the bicycle pedal, said shoe comprising:

a pedal gripping arrangement having a pedal gripping cavity configured for engaging said pedal, which pedal includes a pedal longitudinal axis around which the pedal is rotatable and a partially spherical portion including an outer spherical surface with the partially spherical portion of the pedal being located along the pedal longitudinal axis such that the pedal has a radially symmetrical cross sectional shape along the pedal longitudinal axis, said pedal gripping cavity having a shape that is defined by at least a portion of a spherical surface area such that the pedal gripping cavity directly engages at least portions of the outer spherical surface of the partially spherical portion of the pedal when the shoe is attached to the pedal, the pedal gripping cavity configured to engage the partially spherical portion of the pedal for connection of the shoe with the pedal in any position without regard for the rotational position of the shoe about the pedal longitudinal axis, the pedal gripping cavity also configured to at least partially surround the partially spherical portion of the pedal while remaining free to swivel in various directions about the partially spherical portion of the pedal to at least a predetermined degree when the shoe is attached to the pedal, the various directions including directions in addition to rotation about the pedal longitudinal axis, and wherein the pedal gripping arrangement is made from a pliable material that allows a rider to disconnect the shoe from the pedal by bending their toes up out of a natural relaxed position causing the pedal gripping arrangement to flex thereby expanding the pedal gripping cavity and causing the pedal gripping cavity to disconnect from the pedal.

2. A bicycle shoe according to claim 1 wherein the shoe includes a sole and the pedal gripping arrangement is an independently formed gripping device that is attached to the sole of the bicycle shoe.

3. A bicycle shoe according to claim 1 wherein the pedal gripping arrangement is formed as part of the bicycle shoe.

4. A bicycle shoe according to claim 1 wherein the pedal gripping arrangement is made from a pliable material that allows a rider to more tightly grip the pedal by bending their toes down out of a natural relaxed position causing the pedal gripping arrangement to flex thereby compressing the pedal gripping cavity against the outer spherical surface of the partially spherical portion of the pedal to cause the pedal gripping arrangement to more tightly grip the pedal.

5. A bicycle shoe according to claim 1 wherein the pedal gripping arrangement includes an arrangement for limiting the degree to which the pedal gripping arrangement is able to swivel about an axis that is perpendicular to the pedal longitudinal axis.

6. A bicycle shoe according to claim 5 wherein the pedal gripping cavity includes a cylindrical shaped cavity portion that intersects with and extends entirely through the spherically shaped portion of the pedal gripping cavity, the cylindrical portion of the pedal gripping cavity providing the arrangement for limiting the degree to which the pedal gripping arrangement is able to swivel about an axis that is perpendicular to the pedal longitudinal axis.

7. A bicycle shoe according to claim 1 wherein the pedal gripping cavity contacts only a portion of the partially spherical surface area portion at any given orientation of the shoe with respect to the pedal.

* * * * *